United States Patent
Kuehl

(10) Patent No.: US 12,504,565 B2
(45) Date of Patent: Dec. 23, 2025

(54) HOLOGRAPHIC LIGHTING DEVICE

(71) Applicant: Carl Zeiss Jena GmbH, Jena (DE)

(72) Inventor: Siemen Kuehl, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 18/579,349

(22) PCT Filed: Jul. 14, 2022

(86) PCT No.: PCT/EP2022/069794
§ 371 (c)(1),
(2) Date: Jan. 13, 2024

(87) PCT Pub. No.: WO2023/285619
PCT Pub. Date: Jan. 19, 2023

(65) Prior Publication Data
US 2024/0345295 A1    Oct. 17, 2024

(30) Foreign Application Priority Data
Jul. 15, 2021    (DE) .......................... 102021207574.6

(51) Int. Cl.
*G02B 5/02* (2006.01)
*B60K 35/10* (2024.01)
(Continued)

(52) U.S. Cl.
CPC ............ *G02B 5/0252* (2013.01); *B60K 35/10* (2024.01); *B60K 35/211* (2024.01); *B60K 35/22* (2024.01);
(Continued)

(58) Field of Classification Search
CPC .... G02B 5/0252; G02B 19/0061; B60Q 1/30; B60Q 3/64; B60Q 3/70; B60Q 2400/00;
(Continued)

(56) References Cited

U.S. PATENT DOCUMENTS 5,101,193 A * 3/1992 Smith .................... B60Q 1/302
362/509
5,106,174 A * 4/1992 Smith ...................... G02B 5/32
359/24
(Continued)

FOREIGN PATENT DOCUMENTS

DE    102017109314 A1    11/2018
EP       3783259 A1     2/2021
(Continued)

OTHER PUBLICATIONS

The International Search Report rendered by the International Searching Authority for PCT/EP2022/069794, dated Sep. 27, 2022, 2 pages.
(Continued)

*Primary Examiner* — Zheng Song
(74) *Attorney, Agent, or Firm* — Skaar Ulbrich Macari, P.A.

(57) ABSTRACT

The invention relates to a lighting device for a vehicle having at least one lighting channel for generating a holographic light function assigned to this lighting channel by lighting a holographic structure of the lighting channel. Each channel includes a lighting assembly and a coupling-in surface of a light guide body disposed along a main beam direction of the lighting assembly. The lighting device also includes a holographic structure disposed on the coupling-out surface of the light guide body. The coupling-out surface is disposed in a beam path of the coupled-in light beams, so that lighting of the coupling-out surface takes place at an angle which is greater than a critical angle of the total reflection. The invention also relates to a rear light for a vehicle and to a vehicle.

22 Claims, 7 Drawing Sheets

(51) Int. Cl.
    *B60K 35/21*     (2024.01)
    *B60K 35/22*     (2024.01)
    *B60Q 1/30*     (2006.01)
    *B60Q 3/64*     (2017.01)
    *F21S 43/14*     (2018.01)
    *F21S 43/20*     (2018.01)
    *F21S 43/241*     (2018.01)
    *B60K 35/40*     (2024.01)
    *B60Q 3/70*     (2017.01)
    *B62J 6/04*     (2020.01)
    *F21W 103/35*     (2018.01)
    *F21W 107/17*     (2018.01)
    *F21Y 115/10*     (2016.01)

(52) U.S. Cl.
    CPC ............... *B60Q 1/30* (2013.01); *B60Q 3/64* (2017.02); *F21S 43/14* (2018.01); *F21S 43/241* (2018.01); *F21S 43/2621* (2024.05); *B60K 35/425* (2024.01); *B60Q 3/70* (2017.02); *B60Q 2400/00* (2013.01); *B62J 6/04* (2013.01); *F21W 2103/35* (2018.01); *F21W 2107/17* (2018.01); *F21Y 2115/10* (2016.08)

(58) Field of Classification Search
    CPC ...... B60Q 1/2607; F21S 43/14; F21S 43/241; F21S 43/2621; F21S 43/315; F21S 43/26; F21S 43/26251; B62J 6/04; B62J 6/00; F21W 2103/35; F21W 2107/17; F21Y 2115/10; B60K 35/10; B60K 35/22; B60K 35/425; B60K 35/211; B60K 2360/29; G03H 2223/16
See application file for complete search history.

(56) References Cited

U.S. PATENT DOCUMENTS

| | | | | |
|---|---|---|---|---|
| 5,341,230 | A * | 8/1994 | Smith | G02B 27/0081 |
| | | | | 359/13 |
| 5,347,435 | A | 9/1994 | Smith et al. | |
| 5,455,747 | A * | 10/1995 | Aoyama | G03H 1/30 |
| | | | | 362/545 |
| 5,634,708 | A | 6/1997 | Koie et al. | |
| 5,669,693 | A | 9/1997 | Smith | |
| 5,711,592 | A * | 1/1998 | Hotta | F21S 43/239 |
| | | | | 362/621 |
| 10,175,529 | B2 * | 1/2019 | Fan | G02B 5/28 |
| 10,539,288 | B2 * | 1/2020 | Muegge | G03H 1/0236 |
| 12,158,253 | B2 * | 12/2024 | Mügge | G02B 19/0061 |
| 2001/0033422 | A1 * | 10/2001 | Miura | G02B 3/005 |
| | | | | 359/624 |
| 2008/0013333 | A1 * | 1/2008 | Koizumi | F21S 43/239 |
| | | | | 362/511 |
| 2013/0329444 | A1 * | 12/2013 | Oh | F21S 43/195 |
| | | | | 362/543 |
| 2020/0240610 | A1 * | 7/2020 | Thomae | G03H 1/2202 |
| 2020/0301135 | A1 * | 9/2020 | Yano | H04N 13/363 |
| 2021/0157069 | A1 * | 5/2021 | Lee | G02B 6/4204 |

FOREIGN PATENT DOCUMENTS

| | | |
|---|---|---|
| JP | H07192510 A | 7/1995 |
| JP | 2006107909 A | 4/2006 |
| WO | 2023274608 A1 | 1/2023 |

OTHER PUBLICATIONS

International Preliminary Report on Patentability rendered by the International Searching Authority for PCT/EP2022/069794, dated Jan. 16, 2024, 10 pages.

\* cited by examiner

HOLOGRAPHIC LIGHTING DEVICE

PRIORITY

This application claims the priority of German patent application DE 10 2021 207 574.6, filed Jul. 15, 2021, which are hereby incorporated herein by reference in its entirety.

FIELD

The invention relates to an illumination device for a vehicle with at least one illumination channel for generating a holographic lighting function assigned to this illumination channel by illumination of a holographic structure of the illumination channel. Furthermore, the invention relates to a corresponding rear light for a vehicle and to the vehicle itself, which has a corresponding illumination device.

BACKGROUND

In contrast with normal imaging, for example in photography, phase relationships of the light coming from the object are also stored, in addition to the intensity of the imaged object, in holography. These phase relationships contain additional spatial information, as a result of which, for example, a three-dimensional impression of the image representation can be generated, but other optical functions, which can be realized by diffraction of the light, can also be fulfilled. This is effected with the aid of interference of light rays while the hologram is being recorded. If, for example, an object can be imaged three-dimensionally, the object is illuminated with coherent light, which is reflected and scattered by the object. The resulting wave field, which is known as object wave, is superimposed with light coherent with the object wave (what is known as the reference wave, typically from the same light source, for example a laser), and the wave fields interfere with one another as a function of their phase relationship. The resulting interference pattern is recorded using a light-sensitive layer, for example, and consequently the information contained in the phase is also stored. For reconstruction purposes, the resultant hologram is illuminated using a light wave which is identical or similar to the reference wave, and this light wave is subsequently diffracted by the recorded interference pattern. The original wavefront of the object wave can be reconstructed in this way. There are different types of holograms, for example transmission and reflection holograms, which produce this reconstruction either in transmission or in reflection. For example, if situated in the case of a transmission hologram on the opposite side of the hologram from the light source and the hologram is viewed, then the imaged object appears three-dimensional in front of the viewer.

Holographic lighting elements for vehicles are already known in principle. Various effects can be achieved thereby which go beyond the lighting function of conventional illumination devices, e.g. the generation of a warning function, which due to a three-dimensional impression appears more powerful in the perception of the viewer than a conventional warning lamp and thus increases safety. In particular in the case of motorcycles, safety can be greatly increased by using lamps with holographic elements. For example, other road users often do not maintain a required safety distance from the road user driving the motorcycle because motorcycles themselves take up less space and the required safety distance is often underestimated. The potentially dramatic consequences of this are reinforced by the fact that the motorcycle offers its rider virtually no protective cover by way of a body and substantially no crumple zone. A holographic lighting element which, for example, generates a three-dimensional image at a specific distance from the motorcycle, e.g. as a rear light behind the motorcycle, could greatly increase safety by suggesting to other road users a larger area in which the motorcycle is located. In addition, for example, a holographic brake light can be used to generate a greater signal effect when braking toward the following road user, so that the latter also brakes earlier and/or more strongly and maintains a safe distance from the motorcycle even in the event of a strong braking process of the motorcycle.

Even the use of a hologram for a large-area illumination device in which no three-dimensional image is generated is also conceivable. By using a hologram, unconventional illumination concepts can be achieved which under certain conditions, such as when space is limited, enable large-area and thus particularly visible and safe illumination.

In principle, this type of lighting elements are already known in the prior art, e.g. from WO 2018/054985 A1. This document describes the various possibilities for implementing desired holographic lighting functions for a vehicle.

With a large number of holograms, it is advantageous to use an approximately plane wave for the reconstruction. A perfect collimation of a perfect point light source which is desirable for this purpose can often only be achieved approximately in reality, to be specific if a distance from a finitely extended light source is large enough for the latter to correspond approximately to a point light source. The demands placed on the distance between the light source and the hologram are furthermore due to the fact that a hologram surface to be lit should have a specific minimum size for many applications, and this minimum size must ultimately also be covered by the light beam used for the reconstruction. These demands are frequently in the way of a compact construction of a holographic element. At the same time, however, a compact construction is desirable for a multiplicity of applications in vehicles.

Therefore, it is desirable to provide an illumination device that fulfils the above demands in a compact installation space. In particular in the case of an illumination device for a motorcycle, the installation space is severely limited by a large number of boundary conditions (size of the surfaces, weight, etc.), but the signal effect achievable by the use of a hologram is particularly in demand here.

A further problem of many illumination devices that use a hologram is the lack of suppression of the zero order of the illumination light, which is not diffracted by the hologram. Because of this, viewers may be dazzled and the holographic lighting function may be disturbed.

SUMMARY

Provided herein are an illumination device, a rear light, a lighting display and a vehicle with the illumination device, the rear light and/or the lighting display without the disadvantages of the prior art. The disclosure includes a compact illumination device for a vehicle, which increases the visibility, display visibility and safety of the vehicle, improves the functionality of the illumination, has a good optical quality without disturbing effects, and is at the same time simple and cheap in terms of production. Also provided are a rear light, a lighting display and a vehicle, which benefit from the aforementioned advantages.

Certain embodiments relate to an illumination device for a vehicle with at least one illumination channel for generating a holographic lighting function assigned to this illumination channel by illumination of a holographic structure of the illumination channel. The illumination device comprises an illumination arrangement of the illumination channel for generating illumination light, preferably the illumination light of the illumination channel, and a light guide body having an input coupling surface arranged along a radiation main direction of the illumination arrangement. Furthermore, the illumination device comprises an output coupling surface of the light guide body at which the holographic structure is arranged and wherein the output coupling surface is arranged in a beam path of light rays of the illumination light input-coupled into the light guide body for illumination of the output coupling surface at an angle greater than a critical angle of the total internal reflection.

An exemplary embodiment is intended to be described here for the introduction and a better understanding of the further description, without limiting the scope of protection of the invention thereto: The illumination device, e.g. for a rear light of a motorcycle, has a light guide body in the form of a straight prism having as the base a non-right triangle with a cut-off tip. The prism has an output coupling surface, which is delimited by the long side of the triangle, which lies opposite the cut-off tip, and the height of the prism perpendicular to the base. The input coupling surface is in turn delimited by the short sides of the triangle between the long side and the cut-off tip of the triangle and also by the height of the prism. The lateral surface of the prism thus comprises the input coupling surface and the output coupling surface. The illumination device has, for example, two channels and accordingly two illumination arrangements, each having a light source and collimation lens, which are arranged in such a way that they illuminate sections of the input coupling surface which are assigned to the channel in each case and lie next to one another. The optical axes of the illumination arrangements are arranged along a normal of the input coupling surface in such a way that the most homogeneous radiation of collimated light rays into the input coupling surfaces is ensured. The collimated light beams are parallel to the normal of the input coupling surface and thus penetrate substantially uninterrupted into the light guide body. The input and the output coupling surfaces of the light guide body adjoin each other and enclose an angle which is smaller than 90°. Thus, the output coupling surface is arranged in the beam path of the input-coupled light rays, since they are incident on the output coupling surface without further beam deflection. In this case, the input coupling surface and the output coupling surface enclose an angle which is so large that the input-coupled light rays are incident on the output coupling surface at an angle greater than the critical angle of total internal reflection and are reflected there in principle. On the output coupling surface, at least one holographic structure is present for each channel, which holographic structure is arranged accordingly on the output coupling surface such that it can be illuminated by the respective illumination arrangement. The entire arrangement is advantageously such that there is substantially no overlap of the light rays of two different channels on one of the existing holographic structures. With appropriate illumination, the holographic structure of the respective channel diffracts the input-coupled light from the illumination arrangement of this channel, output-couples it out of the output coupling surface and thus generates the desired lighting function of the channel that is externally visible. For this purpose, the holographic structure and the illumination device are matched to each other e.g. regarding the light and angular spectrum. However, the zero order, or the undiffracted illumination light, is reflected at the output coupling surface and therefore does not leave the light guide body at this point. Thus, a viewer is not dazzled or annoyed by the zero order, which cannot contribute to the lighting function because it is undiffracted. The reflected, undiffracted light can then be reflected in the direction of one of the unused outer surfaces of the prism, for example, where it is output-coupled and/or absorbed without interference. These unused surfaces can also be used as holding or fixing surfaces for the installation of the illumination device. Due to the overall favorable shape and the angular arrangement of the input coupling surface and output coupling surface to each other, a compact rear light can be formed, which is suitable in particular for a motorcycle. At the same time, the illumination properties are very good, and holographic functions can be realized.

An illumination device for a vehicle preferably comprises essential elements of a vehicle illumination and/or a vehicle headlight. This illumination or headlight may preferably be a device selected from the group of high beam, low beam, position light, parking light, direction indicator (commonly: "turn signal"), front fog light, cornering light, wide beam, daytime running light, front beacon, rear light, tail light, brake light, retro reflector, license plate illumination, rear fog light, reversing light, side marker light, side direction indicator and/or signal light.

However, an illumination device for a vehicle may also include an illuminated display or lighting display in an interior of the vehicle. This can be, for example, a display of symbols in the vehicle interior for informing the vehicle occupants/the driver, wherein each illumination channel can be assigned, for example, one display.

A vehicle is in particular a passenger car, a truck, a bus, a minibus, a motorcycle, a scooter, a moped, a bicycle and/or a rail vehicle.

A vehicle may also preferably be an aircraft.

An illumination channel should preferably be understood within the functional sense, wherein each lighting function can be assigned a channel or, vice versa, this channel plays a role in the generation or operation of the lighting function. Furthermore, a channel preferably comprises physically separate components, which are essential for the generation of the lighting function and are preferably different from the components of a further illumination channel. However, there may also be common, quasi shared components. This preferably includes at least 1 illumination channel (sometimes also called "channel" for short). In particular, it includes at least 2 channels. For example, 2, 3, 4, 5, 6, 7, 8, 9, 10, 11, 12, 13, 14, 15, 16, 17, 18, 19, 20, . . . , 25, . . . 30 channels or more may be included.

Generation of a holographic lighting function assigned to this illumination channel by illumination of a holographic structure of the illumination channel preferably means that with suitable illumination, preferably by the illumination arrangement of the illumination channel, the functionality stored in the holographic structure for example by the abovementioned exposure methods is generated, which is generated by diffraction of the illumination light through the structure. The lighting function can, for example, consist of the generation of a two- or three-dimensional, real and/or virtual image that was previously recorded. For example, an illumination can be provided which gives the impression of "standing in the room" and being visible from a plurality of viewing angles, and thereby, for example, makes viewable the same or a decidedly different image. The lighting function may also consist in diffracting the illumination light in a desired manner for the purpose of beam shaping, e.g. for collimation or focusing, with preferably a simultaneous change in the radiation main direction after the output coupling with respect to the radiation main direction before the output coupling. A combination of these lighting functions is also possible.

The holographic lighting function may in particular include the simultaneous generation of a real and/or virtual image. This enables particular information functions and esthetic effects to be achieved.

In particular, the holographic structure is configured to simultaneously generate a real and a virtual image with the illumination.

Preferably, the real image may comprise an image "floating" outside the light guide body.

Preferably, the virtual image may comprise an image located within the light guide body, which is produced, in particular viewed from the outside, behind the holographic structure, i.e. further away from the output coupling surface than it.

A holographic structure in certain embodiments comprises in particular a structure whose lighting function is realized when viewing the holographic structure under a corresponding illumination designed for the structure, or a structure which is configured to generate a corresponding lighting function. In particular, it is a structure whose holographic function was generated by illumination with an object wave and a reference wave. The holographic structure which is arranged at the output coupling surface generates, in particular during the illumination by the illumination arrangement, a lighting function, which can be determined when viewing the output coupling surface.

The holographic structure may comprise, for example, a transmission hologram.

Preferably, each channel comprises at least one separate holographic structure.

However, it may also be preferred that multiple channels or all channels have a common holographic structure. This common holographic structure can have different lighting functions for multiple channels or generate a single lighting function. For example, depending on the number of illuminated channels, a larger or smaller image area can be generated, or only the portion of the image that is generated by the illuminated part of the holographic structure is shown. For example, if the illuminated surfaces of the holographic structure assigned to the respective channels are the same size, only half the holographic lighting function is shown when a channel is switched on.

However, a lighting function can also be generated, which is identical, i.e. the size and visibility of which in space is independent of the number of switched-on channels, but the brightness of the lighting function is here the brighter, the more channels are switched on. For this purpose, the lighting function must preferably be spatially overlapped for a viewer.

The illumination arrangement of the illumination channel for generating the illumination light in certain embodiments comprises in particular at least one light source. The illumination light preferably comprises the light that contributes to the illumination of the holographic structure and thus generates the lighting function.

A radiation main direction (also called chief ray direction, radiation direction, main direction, chief ray or central ray) of the light source is preferably a direction in which a maximum intensity of the light beam or an intensity averaged over all directions is present. The terms radiation main direction and chief ray direction preferably denote the central ray of a beam and its direction, respectively. In this case, the direction of the chief ray indicates the direction of the beam in particular. In the case of a collimated beam, the remaining rays of the beam travel substantially parallel to the chief ray direction, and so the chief ray direction is preferably representative of the rays of a beam. In the case of a non-collimated beam, the rays of the beam preferably span a defined solid angle in whose center the radiation main direction runs.

Thus, an input coupling surface of a light guide body arranged along a radiation main direction of the illumination arrangement preferably denotes an input coupling surface, which is arranged in the radiation direction starting from the illumination arrangement behind the latter on a line therewith, wherein this line preferably is the radiation main direction of the illumination arrangement. In particular, the illumination arrangement and the input coupling surface are arranged along an optical axis for these two elements.

An input coupling surface is preferably an outer interface of the light guide body, which is arranged for the input-coupling of light from the illumination arrangement into the light guide body.

The light guide body is preferably transparent for a substantial part of the spectrum of the illumination arrangement. In particular, the light guide body is transparent for visible light, e.g. having a wavelength of approximately 380 nanometers (nm) up to 750 nm. The light guide body can, for example, comprise a glass or PMM substrate, however, may additionally comprise at least one layer or coating, which may comprise at least one film, for example.

The illumination arrangement and input coupling surface are preferably configured to input-couple light rays from the illumination arrangement into the light guide body. The fact that the illumination arrangement and the input coupling surface are arranged for input-coupling light rays from the illumination arrangement into the light guide body should preferably be understood as a structural feature in the sense that light rays from the illumination arrangement are actually coupled through the input coupling surface when the illumination arrangement is switched on. These two components are preferably arranged and/or designed for this purpose. This means, for example, that the input coupling surface, like the rest of the light guide body, is substantially transparent for the light from the illumination arrangement and the arrangement, dimensioning, shape and/or orientation of both components has been made in relation to each other in order to input-couple a quantity of light with desired properties required for the lighting function of the channel into the light guide body. For example, the illumination arrangement is arranged opposite the input coupling surface and/or is aligned such that a chief ray direction of the illumination arrangement runs in the direction of the input coupling surface. Preferably, the illumination arrangement and the input coupling surface are arranged in relation to each other such that at a given distance between the illumination arrangement and the input coupling surface, a coupled intensity which can be used for generating the lighting function is maximized.

An output coupling surface is preferably an outer interface of the light guide body.

An output coupling surface is in particular an outer interface of the light guide body, which is configured to output-couple light from the illumination arrangement out of the light guide body. The output coupling surface is preferably the surface at which the light from the illumination arrangement input-coupled into the light guide body substantially actually exits therefrom or at which this light is reflected. The output coupling surface can, for example, be the outer interface of a substrate encompassed by the light guide body and/or an outer interface of a layer that is also encompassed by the light guide body and was applied to the substrate, for example. This can be a film, for example. In particular, the output coupling surface is likewise transparent for the light radiation conducted in the light guide body. However, the output coupling surface may also be colored so that it is transparent but has a color.

Preferably, the output coupling surface is the surface which substantially lies in the beam path of the input-coupled light rays and on which the refractive index changes significantly at the transition between the light guide body and the surrounding medium. Significant means preferably by at least 10%, Terms such as "substantially, approximately, about, circa", etc., preferably describe a tolerance range of less than +20%, preferably less than +10%, even more preferably less than +5%, and in particular less than +1%. Information of substantially, approximately, about, circa etc. discloses and always includes the exact stated value.

The holographic structure is arranged on the output coupling surface.

Preferably, this may mean that the output coupling surface includes the holographic structure.

In particular, it means that the holographic structure is arranged at the output coupling surface. Preferably, it means that the holographic structure is located in the vicinity of or directly or indirectly adjoins the output coupling surface. This holographic structure may, for example, be incorporated into the substrate directly "below" the output coupling surface. However, the holographic structure may also be encompassed in an outer layer of the light guide body applied to the substrate, wherein the holographic structure is encompassed between the substrate and the output coupling surface, for example in a film.

The fact that the holographic structure is arranged at the output coupling surface preferably means that the holographic structure is present at the output coupling surface, but is not directly encompassed thereby. For example, the terminating surface may comprise a plurality of layers, for example a plurality of films, wherein the holographic structure is encompassed by at least one of these layers, but not by the outermost film or layer, which delimits the light guide body to the outside. This can be, for example, a protective layer, which protects the holographic structure and/or the remaining light guide body from external influences. For example, the holographic structure may also be encompassed by an outermost layer which comprises the output coupling surface, but where the holographic structure is not present at this outermost surface of the layer but within the layer or a surface opposite the outer surface in the interior of the light guide body.

Preferably, the holographic structure is present within at least one layer between an outer surface of the substrate and the output coupling surface, wherein the output coupling surface in particular comprises an outer interface of the at least one layer. The outer interface is preferably the at least one interface of the at least one layer which delimits the layer to the outside and is not directly present at the substrate. This is preferably comprised by the feature that the holographic structure is arranged at the output coupling surface.

Also, the holographic structure in the interior of the light guide body, in particular in the interior of the substrate, however, can be present directly at the output coupling surface. For example, the holographic structure may be introduced into the light guide body, in particular into the substrate, by suitable methods. Directly at the output coupling surface is understandable for the person skilled in the art insofar as the person knows that the holographic structure is present in the direct vicinity of the output coupling surface. This may mean, for example, that the holographic structure is arranged at a distance from the output coupling surface of 5 mm (mm) or less, 4 mm or less, 3 mm or less, 2 mm or less, 1 mm or less, 0.9 mm or less, 0.8 mm or less, 0.7 mm or less, 0.6 mm or less, 0.5 mm or less, 0.3 mm or less, 0.2 mm or less, 0.1 mm or less, 50 µm or less, 10 µm or less, 5 µm or less, or 1 µm or less.

Preferably, the holographic structure is parallel to the output coupling surface. This may preferably be comprised by the feature that the holographic structure is arranged at the output coupling surface.

Preferably, the feature that the holographic structure is arranged at the output coupling surface means that the holographic structure is arranged in a region of the output coupling surface, for example in the immediate environment of the output coupling surface.

Preferably, the holographic structure is present in the interior of the light guide body arranged at the output coupling surface. This means in particular that the holographic structure is not directly arranged at an outer surface of the light guide body, but for example, is present. "below" it.

The fact that the holographic structure is arranged at the output coupling surface preferably means that undiffracted light (for example the zero order of diffraction in a transmission hologram and undiffracted transmitted light in a reflection hologram) which is incident on the output coupling surface at an angle greater than the angle of total internal reflection, is not output-coupled but reflected.

The output coupling surface is arranged in a beam path of the light rays of the illumination light input-coupled into the light guide body. This means that it lies in the beam path of light rays of the illumination light input-coupled into the light guide body and is impinged upon by the majority of the input-coupled light rays. It is obvious to a person skilled in the art that this preferably means that the output coupling surface for this purpose is arranged at an angle not equal to zero with respect to the radiation main direction of the input-coupled rays and intersects them or the beam path such that the rays are incident on the output coupling surface. In particular, the output coupling surface is arranged for illumination of the output coupling surface at an angle of less than 90°, this angle being measured in particular with respect to a surface normal of the output coupling surface.

Preferably, the geometric profile of light rays through the device, in particular along the radiation main direction, is referred to as the beam path. Beam path can preferably be synonymous with the radiation main direction. Beam path can be used synonymously with the word beam profile.

The angle mentioned here is preferably synonymous with the illumination angle and/or the angle of incidence.

The arrangement angle of the output coupling surface can be determined in particular directly via the prism angle lying between the input coupling surface and the output coupling surface, provided the light guide body is designed in the manner of a prism.

The larger the illumination angle or the prism angle, the flatter can advantageously the preferably prism-type light guide body be realized. Therefore, large angles approaching the maximum 90° are very desirable. However, at large illumination angles, the materials of the holographic structures (e.g. photopolymer) typically absorb very strongly and/or the Fresnel losses increase, which means that a realistic limit of the illumination angle can often be about 80°. Using modern materials for the holographic structures, however, these angles can be further increased so that they approach the 90° further and thus a particularly flat component can be provided.

Preferably, "the output coupling surface is arranged in a beam path of the input-coupled light rays" means that the output coupling surface is arranged at an angle of less than 90° with respect to the input coupling surface, wherein this angle preferably designates an angle located within the light guide body.

The output coupling surface is preferably arranged for illumination of the output coupling surface at an angle greater than a critical angle of total internal reflection. Since the holographic structure is preferably arranged at the output coupling surface, such an arrangement can preferably entail a corresponding arrangement of the holographic structure in relation to the beam path or a radiation main direction of the input-coupled light rays. The angle is preferably measured by the angle between the beam path or a radiation main direction of the input-coupled light rays and the surface normal of the output coupling surface.

It is preferable that when used normally or when using the illumination device, the output coupling surface is adjacent to air under or in the range of standard conditions, and correspondingly a critical angle of total internal reflection can be calculated, with knowledge of the refractive indices both of the light guide body comprising the output coupling surface at which, for example, the hologram film and also further cover or protective films may be present, and of the adjoining air. A person skilled in the art knows how to calculate the critical angle and can design the device accordingly. In particular, the critical angle can be calculated using the equation $\vartheta_C = \arcsin(n_2/n_1)$, where $n_1$ denotes the refractive index of the optically denser medium of the light guide body, for example PMMA in this case, and $n_2$ denotes the refractive index of the optically thinner medium, for example air in this case.

Air under standard conditions refers in particular to air pursuant to ISO 2533, especially air at 288.15 Kelvin (K) or 15° C., an air pressure of 1013.25 hectopascals (hPa), and a relative humidity of 0 or dry air. However, a person skilled in the art can also assume the usual refractive index of approximately 1 for air and calculate the critical angle accordingly.

However, it may also be preferable for the output coupling surface to adjoin a material other than air. Then, too, a person skilled in the art knows how the critical angle of the total-internal reflection needs to be calculated on the basis of a change in the refractive index at the output coupling surface.

By illuminating the output coupling surface at an angle greater than a critical angle of total-internal reflection, it is possible to suppress in particular transmission or output coupling of the zero order or of undiffracted illumination light from the output coupling surface. The zero order or illumination light undiffracted by the holographic structure is advantageously undesirable, since it does not comprise any information stored in the holographic structure and can cause a potential glare and/or misinformation of the viewer.

Thus, an illumination device can be provided which is particularly simple in construction, has a compact design, and can provide an improved holographic lighting function.

In an example embodiment, the illumination device is configured (such) that each input-coupled light beam which reaches the output coupling surface does not reach the output coupling surface again due to total internal reflection.

For a holographic structure in the form of a transmission hologram, this preferably means that the corresponding part of each input-coupled light beam which reaches the output coupling surface was either previously diffracted by the transmission hologram in such a way that it is now coupled out (preferably first order of diffraction of the hologram) or that the corresponding part of each input-coupled light beam which reaches the output coupling surface has not been previously diffracted by the transmission hologram (preferably zero order of diffraction of the hologram) is then reflected once at the output coupling surface and then preferably continues such that it does not reach the output coupling surface again, in particular not through further total internal reflection within the light guide body.

For a holographic structure in the form of a reflection hologram, this preferably means that the corresponding part of each input-coupled light beam which reaches the output coupling surface is either reflected by it once and then either diffracted by the reflection hologram in such a way that it is now coupled out (preferably first order of diffraction of the hologram) or is transmitted by the reflection hologram (preferably zero order of diffraction of the hologram) and then preferably continues such that it does not reach the output coupling surface again, in particular not through further total internal reflection within the light guide body.

This can be achieved in particular by a shape of the light guide body being adapted to the beam profile. For example, a ratio of a thickness of the light guide body perpendicular to the output coupling surface to a length of the light guide body parallel to the output coupling surface may be chosen in favor of the length in such a way that the light rays which are totally internally reflected at a given angle at the output coupling surface, do not reach this output coupling surface again by total internal reflection within the light guide body (e.g. at another interface of the light guide body). Once a skilled person has been familiarized with this idea, this person can create a corresponding design of the illumination device based on considerations of geometric optics. The interface(s) of the light guide body which is then reached by the light rays in the further beam profile can then be designed in particular in such a way that a reflection at this interface is minimized and in particular no total internal reflection takes place at it. For this purpose, the interface can, for example, form a corresponding angle with the light rays and/or be coated accordingly (e.g. anti-reflection or absorber layer).

In an example embodiment, the holographic structure is configured to generate the lighting function of the illumination channel during illumination by the illumination arrangement of the illumination channel. This preferably means that the holographic structure during illumination by the illumination arrangement of the illumination channel, in particular as described above, generates the lighting function. Above all, the holographic structure in terms of the acceptance spectrum (wavelength or frequency of the light) and the acceptance angle and the acceptance angular spectrum is adapted to the illumination from the illumination arrangement such that the spectrum, the illumination angle and the angular spectrum of the illumination by the illumination arrangement can effectively and/or efficiently bring about the holographic lighting function. The acceptance spectrum and also the acceptance angle and the acceptance angular spectrum of the holographic structure and the spectrum, illumination angle and angular spectrum of the illumination by way of the illumination arrangement advantageously substantially match or overlap. An effective and/or efficient illumination device can thus be provided.

The holographic structure may preferably be configured to generate the lighting function only during illumination by the illumination arrangement of the channel. This preferably means that the holographic structure does not generate a lighting function in the case of illumination by an illumination arrangement of another channel, if this should also reach the holographic structure. This can be achieved, for example, in that the illumination arrangement of the other channel has a spectrum which substantially does not match the acceptance spectrum of the holographic structure. Preferably, the acceptance angular spectrum of the holographic structure can also be such that substantially no holographic lighting function is generated in the case of illumination from the direction of the other illumination channel. This enables improved separation of the holographic lighting functions of the illumination channels.

In an example embodiment, the output coupling surface and holographic structure are configured to generate the holographic lighting function by output-coupling input-coupled light rays of the illumination light out of the output coupling surface. The holographic lighting function is advantageously intended to be provided by the holographic structure by the diffraction and subsequent output coupling of the input-coupled light rays from the output coupling surface. For this purpose, the holographic structure and output coupling surface are preferably matched to each other. This can relate for example to the arrangement of the holographic structure, which, for example in the case of a holographic structure in the form of a reflection hologram, is advantageously arranged at the output coupling surface, but within the light guide body below the output coupling surface. The output coupling surface is preferably referred to as being above with respect to the remaining light guide body for the purpose of this description. The different arrangements of the holographic structure in relation to the output coupling surface will be further elaborated in the following text.

In a further example embodiment, the holographic structure comprises at least one transmissive hologram. A transmissive hologram is preferably also referred to as a transmission hologram, A transmission hologram comprises in particular a hologram whose lighting function is realized when viewing the hologram from one side under illumination from the other side, or which is configured to generate a corresponding lighting function. In particular, the structure is an at least partly light-transmissive structure whose holographic function was generated by illumination with an object wave and a reference wave from the same side of the structure. The transmission hologram, which is encompassed by the output coupling surface or is arranged at it, generates a lighting function which can be determined when viewing the output coupling surface in particular during the illumination by the illumination arrangement.

The transmission hologram is preferably arranged directly below the output coupling surface, so that the light is diffracted by the transmission hologram and only the zero order is reflected at the output coupling surface.

The possible arrangements of the transmission hologram can correspond to those of the reflection hologram (see below).

The use of a transmission hologram enables an inexpensive component with a particularly simple construction. A transmission hologram can advantageously have a wider diffraction spectrum for a specific angle range of the illumination compared with a reflection hologram and thus increase the output coupling efficiency.

In a further example embodiment, the holographic structure encompasses at least one reflective hologram, wherein the reflective hologram and the output coupling surface are configured and/or arranged to generate the holographic lighting function after a reflection of the input-coupled light rays at the output coupling surface.

A reflective hologram is preferably also referred to as a reflection hologram. In this case, it is preferably configured and arranged in such a way that illumination light which has been input-coupled into the light guide body and has not yet been reflected at the output coupling surface is not diffracted by the reflective hologram, but is simply transmitted. This light is then preferably reflected at the output coupling surface and is then incident again on the reflective holographic structure. Then this light is preferably reflected by the reflection hologram and thereby diffracted according to the lighting function to be generated.

For example, the hologram is efficient for the angle after reflection at the outer layer or output coupling surface. Depending on the convention, this angle accordingly has the opposite sign, for example −70° instead of 70°.

The reflection hologram is preferably arranged directly below the output coupling surface so that the light is reflected at the output coupling surface and then diffracted by the reflection hologram. A plurality of arrangements or constructions of reflection hologram and output coupling surface are conceivable, for example a reflection hologram incorporated in a substrate of the light guide body, wherein the output coupling surface comprises the interface of the substrate or a layer applied thereto, for example a film. It is also conceivable that the reflection hologram is incorporated into the interface of the substrate and a further layer located thereon, for example a film, encompasses the output coupling surface. It may also be the case that the reflection hologram is encompassed in one of at least two layers, for example two films, wherein neither is the top layer or film which encompasses the output coupling surface.

"Top" and "bottom" with respect to the light guide body and/or the output coupling surface, as used in this document, are preferably defined by the arrangement of the output coupling surface at the light guide body, wherein the output coupling surface is located at the upper side of the light guide body or defines "above" and all further arrangements which are part of the light guide body are "below" it. Alternatively, "top" is defined by the direction of the illumination light which has been input-coupled into the light guide body and has not yet been reflected at the output coupling surface.

The use of a reflection hologram described here combines its advantages, namely that it is advantageously particularly wavelength-selective for an output-coupled illumination beam under a given illumination angle, with the other advantages of the device, namely compact design, simple beam path, which has a high illumination quality, for example particularly good collimation, and prevents an output coupling of undiffracted light (advantageously the zero order). For example, a broadband, advantageously inexpensive light source can thus be used and yet a narrow-band lighting function appearing predominantly monochromatic can be generated.

It may be preferred that the holographic structure comprises both at least one transmission hologram and at least one reflection hologram, which are preferably arranged next to each other. For example, the different advantages of the respective holograms can be applied depending on the desired holographic lighting function.

In a preferred embodiment, the output coupling surface is arranged in the beam path of light rays of the illumination light input-coupled into the light guide for the direct illumination of the output coupling surface by the input-coupled light rays of the illumination light.

Direct illumination of the output coupling surface is in particular illumination of the output coupling surface by the input-coupled light rays without additional previous reflection of the light rays within the light guide body. In this way, when using a holographic structure in the form of a transmission hologram, direct illumination of the transmission hologram in the above sense is also preferably achieved, in which the light is diffracted directly by the latter.

In a holographic structure in the form of a reflection hologram, the direct illumination of the output coupling surface preferably leads to a single reflection of the input-coupled light rays taking place at the output coupling surface before the light is diffracted by the holographic structure in the form of a reflection hologram and thus is output-coupled out of the output coupling surface. This enables the provision of a particularly simple and compact component with very good optical properties.

In a further example embodiment, the light guide body comprises a transparent substrate and at least one layer applied to the transparent substrate, wherein the output coupling surface is encompassed by the at least one layer, wherein the holographic structure is present within the at least one layer between the substrate and the output coupling surface.

This embodiment is preferably comprised by the feature that the holographic structure is arranged at the output coupling surface.

The light guide body can, for example, comprise a transparent glass or PMMA substrate. The at least one layer preferably comprises one or more of the following layers: Hologram layer, which preferably comprises the holographic structure, layer comprising triacetate, transparent adhesive layer or adhesive film (e.g. OCA) and/or layer/film comprising polycarbonate (PC). In particular, at least the hologram layer is encompassed. The layer may in particular comprise a film, such as a hologram film, a triacetate film, an adhesive film and/or a polycarbonate film.

In a further example embodiment, the holographic structure is arranged at an outer surface of the light guide body that lies opposite to the output coupling surface and parallel to the output coupling surface, wherein the outer surface parallel to the output coupling surface is preferably arranged 5 mm or less from the output coupling surface.

This embodiment is preferably comprised by the feature that the holographic structure is arranged at the output coupling surface.

In a further example embodiment, the light guide body comprises a transparent substrate and at least one layer applied to the transparent substrate, wherein the output coupling surface is encompassed by the at least one layer, wherein the holographic structure is present within the at least one layer between the substrate and the output coupling surface, wherein the at least one layer comprises at least one stop layer having a transmission of 60% or less, preferably 50% or less, wherein the latter is arranged closer to the output coupling surface than the holographic structure, or wherein it is arranged further away from the output coupling surface than the holographic structure.

In particular, the transmission for the visible spectrum and/or for large parts within the visible spectrum is given, wherein large parts of the visible spectrum comprise 100 nm or more, preferably 200 nm or more and in particular 300 nm or more of the visible spectrum.

In a further example embodiment, the output coupling surface is arranged at an angle to the radiation main direction of the input-coupled light rays of the illumination light between 0° and a complementary angle of the critical angle of the total internal reflection. In this case, the angle is preferably measured directly between said radiation main direction and the output coupling surface.

The complementary angle to a given angle is preferably the angle that complements the given angle to an angle of 90°. Since the critical angle of the total internal reflection of an interface between two media having different refractive indices (in this case this interface is preferably the output coupling surface) is preferably measured at a perpendicular to this interface, the complementary angle of the critical angle of the total internal reflection is preferably the angle between this critical angle and the interface.

With this embodiment, a suppression of the output coupling of undiffracted light and/or the zero order from the output coupling surface can be achieved particularly easily.

In a further example embodiment, the input coupling surface is arranged in a plane perpendicular to a radiation main direction (preferably of the beam path) of the illumination arrangement, wherein the input coupling surface and the output coupling surface enclose an angle of between a critical angle of the total internal reflection and 90°. The compact component with the desired optical properties can thus be realized particularly easily. Fresnel losses during input coupling can be minimized. The radiation main direction is preferably not changed by the input coupling surface. Preferably, the radiation main direction before and after the input coupling encloses an angle of 90° with the plane or the input coupling surface.

It may be preferred that the radiation main direction of the illumination arrangement matches the radiation main direction of the input-coupled rays, in particular when the input coupling surface is arranged in a plane perpendicular to a radiation main direction of the illumination arrangement and has no beam-shaping function.

In a further example embodiment, the input coupling surface is not arranged in a plane perpendicular to a radiation main direction (preferably of the beam path) of the illumination arrangement. The radiation main direction is preferably changed here by the input coupling surface. This allows specific conditions relating to the installation space and the beam path to be satisfied.

In a further example embodiment, the input coupling surface is not arranged in a plane perpendicular to a radiation main direction of the illumination arrangement, wherein the input coupling and output coupling surfaces are arranged so as to enclose an angle of 90° and wherein the light guide body preferably widens toward the input coupling surface. In particular, the input coupling surface is arranged at an angle of less than 90° with respect to the radiation main direction of the illumination arrangement. The angle between the radiation main direction of the illumination arrangement and the output coupling surface (preferably before input-coupling into the light guide body) is at the same time preferably less than 90° (preferably measured at the surface normal to the output coupling surface). Thus, it is advantageously ensured that the input-coupled light is incident on the output coupling surface and/or satisfies the abovementioned conditions, in particular that the output coupling surface is illuminated, to be specific at an angle greater than a critical angle of the total internal reflection. In addition, a convention is thus preferably given as to the direction in which the angle between the radiation main direction of the illumination arrangement and the input coupling surface is measured. With the oblique input coupling of the light rays from the illumination arrangement into the light guide body, which results advantageously from this embodiment, the light rays are preferably refracted such that the angle does not fall below a critical angle of the total internal reflection between the radiation main direction of the input-coupled light rays and the output coupling surface. By widening the light guide body toward the input coupling surface, in particular, input coupling of a large part of the light rays from the illumination arrangement can be realized. Preferably, the light guide body is widened toward the output coupling surface for increased and/or improved beam input coupling.

In a further example embodiment, the illumination device comprises a reflection surface of the light guide body arranged in the beam path between the input coupling surface and the output coupling surface for a single total internal reflection of the input-coupled light rays of the illumination light at the reflection surface before the illumination of the output coupling surface. The fact that the reflection surface of the light guide body is for a single total internal reflection of the input-coupled light rays of the illumination light at the reflection surface before the illumination of the output coupling surface preferably means that it is accordingly arranged in the beam path of the input-coupled light rays, so that each beam is totally internally reflected exactly once at the reflection surface and each light beam is then directly incident on the output coupling surface. The light can be diffracted beforehand when using a holographic structure in the form of a transmission hologram. When using a holographic structure in the form of a reflection hologram, the light is preferably first reflected exactly once at the output coupling surface and then diffracted by the hologram.

The reflection surface is arranged in particular such that the input-coupled light rays are incident thereon at an angle greater than the critical angle of the total internal reflection and are reflected thereby onto the output coupling surface in such a way that the light rays are in turn incident thereon at an angle greater than the critical angle of the total internal reflection.

In this way, specific installation space requirements can be met and at the same time simple beam guidance can be realized, which represents a homogeneous lighting of the output coupling surface.

It is particularly preferred that the light guide body has an output coupling surface parallel to the input coupling surface, and the reflection surface is an outer surface of the light guide body located directly between the input coupling surface and the output coupling surface. This allows a particularly flat illumination device to be implemented.

In another example embodiment, the input coupling surface is arranged in a plane perpendicular to a radiation main direction of the illumination arrangement, wherein the reflection surface is arranged at an angle with respect to the input coupling surface such that the input-coupled light rays of the illumination light are totally internally reflected at the reflection surface and the output coupling surface is illuminated at an angle greater than a critical angle of the total internal reflection. It is particularly preferred here that the light guide body has an output coupling surface parallel to the input coupling surface, and the reflection surface is an outer surface of the light guide body located directly between the input coupling surface and the output coupling surface. This particularly simply constructed and compact embodiment is described as an example in FIG. 14.

In a further example embodiment, a projection of the output coupling surface on a plane of the input coupling surface has the same dimensions as the input coupling surface. This is highly advantageous both for manufacturing and minimizing an installation space of the illumination device. In a preferred beam profile which substantially forms a right angle with the arrangement plane of the input coupling surface and completely lights the input coupling surface, the output coupling surface is thus likewise substantially completely lit, without substantially losing a part of the input-coupled illumination light because it is not incident on the output coupling surface (and on the holographic structure arranged on it).

In a further example embodiment, the light guide body has the shape of a straight prism, wherein a lateral surface comprises the input coupling surface and the output coupling surface, wherein the output coupling surface preferably adjoins the input coupling surface. In particular, the light guide body may have the shape described above and in the figures. Such a light guide body is particularly compact and inexpensive to manufacture.

Preferably, this comprises a further outer surface of the light guide body here which is arranged in such a way that the zero order rays totally internally reflected by the output coupling surface are incident thereon. This further outer surface is in turn preferably arranged such that the incident rays are not totally internally reflected again within the light guide body, in particular not in the direction of the output coupling surface. In particular, the rays incident on the further outer surface enclose with the latter an angle smaller than the critical angle of the total internal reflection. Thus, the rays can be output-coupled at this surface, where they preferably do not disturb, and/or can be absorbed by this surface, e.g. by an appropriate coating and/or a further element. The outer surface can, for example, also include a beam trap (e.g. by blackening the surface) to minimize any Fresnel reflections.

Preferably, the further outer surface is also arranged in such a way that Fresnel-reflected rays do not propagate in the direction of the viewer. A person skilled in the art knows how to arrange the outer surface by way of calculation and design.

Preferably, the further outer surface directly adjoins the output coupling surface.

In a further example embodiment, the holographic structure comprises a volume hologram. In particular, volume holograms not only have a surface that comprises holographically stored information, but their thickness is likewise used for storing holographic information.

In a further example embodiment, the input coupling surface and/or the output coupling surface is planar. This ensures a particularly simple production, and at the same time the optical beam path is easy to design, substantially without any disadvantages in terms of the optical quality. At the same time, this embodiment is particularly well suited for integration in a vehicle. Preferably, this embodiment likewise comprises the fact that the input coupling surface and/or the output coupling surface are predominantly planar, but are rounded at their peripheral regions for better esthetic integration into the vehicle, a better cw value, an adaptation to applicable safety standards for vehicles and/or a better adaptation to existing installation space.

In a further example embodiment, a projection of the input coupling surface on a plane of the illumination arrangement has the same dimensions as the illumination arrangement. This enables optimum use of the installation space. Advantageously, the illumination arrangement and the input coupling surface are arranged along the beam path, which preferably also forms the optical axis of both elements and is substantially perpendicular thereto. The illumination arrangement may comprise a collimation lens in particular next to the light source. In this or a similar constellation, the same installation space is occupied by the input coupling surface and the illumination arrangement perpendicular to the optical axis, which is enormously advantageous in terms of installation technology. In particular, this installation space located perpendicular to the beam path before the output coupling through the output coupling surface is often particularly limited in a vehicle and/or forms a uniform surface, meaning that this embodiment is particularly advantageous. At the same time, this arrangement makes optimum use of the installation space provided.

In a further example embodiment, a main direction of light rays output-coupled out of the output coupling surface forms an angle with a surface normal of the output coupling surface which is configured to direct the light in the direction of an eyebox of a viewer. Preferably, this angle can be adapted due to the diffraction properties of the holographic structure and preferably does not correspond to the radiation main direction of the input-coupled rays. This main direction of the output-coupled light rays runs in particular in the case of a rear light or a brake lamp (brake light) along or in a horizontal and/or an average eyebox height and/or in the direction of a position of a following road user.

In a further example embodiment, a main direction of light rays output-coupled out of the output coupling surface forms an angle of 0° to 40° with a surface normal of the output coupling surface. In particular, this refers to the absolute value of the angle, so that different angular directions with respect to the surface normal are included. This may preferably refer to an angle in a horizontal plane with respect to a vehicle in which the illumination device may be mounted. It may also refer to an angle in a vertical plane relative to a vehicle. However, this may refer to angles in arbitrary planes which can meet the above-stated conditions with respect to the main direction of light rays that are output-coupled out of the output coupling surface.

In this way, the respective desired illumination properties can be realized. For example, it is conceivable that the illumination device is mounted as a rear light at a region of a fender of a motorcycle that is arranged obliquely with respect to the vertical. Then the output coupling surface can also be oblique. With the abovementioned embodiments it can be ensured that a road user behind the motorcycle can perceive the holographic lighting function, because the output-coupled light rays are at least in part incident in their eyebox.

In a further example embodiment, a field-of-view of the holographic lighting function in a first plane is 120° or more, in particular between 135° and 180°.

Preferably, the field-of-view determines the size of the eyebox. In a further preferred embodiment of the invention, a field-of-view of the holographic lighting function in a second plane is 25° or more, in particular between 30° and 60°. Preferably, the second plane is perpendicular to the first plane.

In a further example embodiment, in the longitudinal sectional plane, a first extent of the illumination device perpendicular to the radiation main direction of the illumination arrangement has a ratio of at least 1:1.5, preferably at least 1:2, particularly preferably at least 1:3, to a second extent of the illumination device perpendicular to the main direction of output-coupled light rays.

The longitudinal sectional plane preferably corresponds to a plane parallel to the radiation main direction of the illumination arrangement, which is both perpendicular to the input coupling surface and to the output coupling surface.

The first extent of the illumination device perpendicular to the radiation main direction of the illumination arrangement preferably represents the projection of the illumination device in the longitudinal plane perpendicular to the radiation main direction and can provide an essential statement about the occupied installation space along this direction. The installation space at a vehicle, in particular a motorcycle, is limited in particular in this direction.

The second extent of the illumination device perpendicular to the main direction of output-coupled light rays preferably represents the projection of the illumination device in the longitudinal plane perpendicular to the main direction of output-coupled light rays and can provide an essential statement about the occupied installation space along this direction and/or about the surface of the illumination device effectively contributing to the generation of the lighting function.

The first extent in the longitudinal sectional plane of the illumination device perpendicular to the radiation main direction of the illumination arrangement may, for example, correspond to the (extent of the) input coupling surface in the longitudinal sectional plane perpendicular to the radiation main direction of the illumination arrangement.

The second extent of the output-coupled light rays perpendicular to the main direction of output-coupled light rays can, for example, correspond to the output coupling surface when the light rays are output-coupled from it vertically. This size will preferably be a measure of the outwardly visible light-emission surface or the light-emission surface used for generating the lighting function (preferably on the output coupling surface). This ratio achieves an ideal ratio between critical, required installation space and effective light-emission surface, which is particularly suitable for use in a vehicle with a limited installation space but high safety requirements regarding the illumination.

In a further example embodiment, the light guide body comprising at least one further outer surface of the light guide body is configured to minimize the dimensions of the light guide body without negative impact on the illumination of the holographic structure through the outer surface and/or without total internal reflection of light rays, totally internally reflected at the output coupling surface, at the outer surface. This can be achieved in particular by a suitable geometry selection as described in some embodiments.

This enables the provision of a particularly compact and at the same time improved illumination device.

In a further example embodiment, the illumination arrangement comprises a light source and a beam-shaping component which are preferably arranged along the radiation main direction (or the beam path) of the illumination arrangement. Preferably, this radiation main direction is specified by the beam-shaping component. Thus, the beam properties can be positively influenced and, for example, a collimation of the beam can be brought about so that the holographic structure is illuminated with a small angular spectrum.

In a further example embodiment, the beam-shaping component comprises a lens, preferably a collimation lens, which is configured to collimate the light rays from the light source, wherein the collimation lens is arranged in particular such that the focal plane coincides with the emitter surface of the light source. This enables improved collimation of the light rays.

In a further example embodiment, the beam-shaping component is configured to adapt the light beams from the light source to a reference wave with which the holographic structure and/or the structure region has been recorded, in particular with regard to the angle of incidence and/or the angular spectrum.

An adaptation of the light beams from the light source to a reference wave with which the holographic structure and/or the structure region has been recorded preferably means a substantial or partial agreement between the beam properties of the light beams from the light source with those of the reference wave. The beam properties preferably affect the frequency spectrum (preferably spectrum for short), the illumination angle or angle of incidence and/or the angular spectrum. Thus, a holographic lighting function with good optical properties without smearing and/or double images can be achieved.

In a further example embodiment, defined light beams comprise light beams adapted to the hologram, preferably adapted to a reference wave with which the holographic structure was recorded, wherein the light beams are adapted in particular with respect to a frequency spectrum, an angle of incidence, an angular spectrum, a temporal coherence, a spatial coherence and/or a polarization.

Preferably, defined light beams are synonymous with an adaptation of the light beams.

In a further example embodiment, an angular spectrum of the illumination of the holographic structure is smaller than 5°, preferably smaller than 2°, more preferably smaller than 1° and in particular smaller than 0.5°. A small angular spectrum preferably has a particularly positive effect on the quality of the holographic lighting function.

The angular spectrum can preferably be ascertained by determining the root mean square of the difference of all angles from the target reconstruction angle (preferably so-called RMS radius).

In a further example embodiment, the angular spectrum of the illumination of the holographic structure differs by less than 1° from a reference angular spectrum of the reference wave with which the holographic structure was recorded and preferably comprises an angular spectrum of 0°-5°. This angular spectrum has proved to be particularly advantageous because it places low demands on the manufacture of the holographic structure and is therefore particularly fast and inexpensive to produce.

In a further example embodiment, the beam-shaping component comprises an aspherical lens. The latter has particularly favorable beam properties and can advantageously counteract an aberration.

In a further example embodiment, the beam-shaping component comprises a free-form lens, in particular a sphere or a toroid. As a result, beam shapes that are particularly well adapted individually to the illumination device can be attained.

In a further example embodiment, the input coupling surface is not planar and is configured for a light-shaping function, wherein the input coupling surface is preferably curved in a defined manner.

Defined manner preferably means here that the curvature can be described mathematically.

Owing to the input coupling surface which has a light-shaping function, e.g. similar to a lens, installation space along the direction of the beam path can advantageously be saved, since no additional beam-shaping component needs to be used.

The light-shaping function can, for example, generate collimated, convergent or divergent light beams, preferably without changing the radiation main direction. However, it may also be preferable to change the radiation main direction.

It may also be advantageous to use an input coupling surface with a light-shaping function together with a beam-shaping component. For example, due to the joint action on the light beam, the quality of the desired property, e.g. the collimation, can be improved and under certain circumstances installation space can be saved because the beam-shaping component can be kept more compact than in the case where the input coupling surface does not support the beam shaping.

It may likewise be advantageous that in the aforementioned case of a joint use of a beam-shaping component and a light-shaping input coupling surface, these two have different effects on the light beam (e.g. act in different directions perpendicular to the beam direction) and thus an improved and more complex beam shaping can be realized.

In a further example embodiment, the beam-shaping component and/or its optically functional surfaces have a rectangular boundary. Due to the rectangular boundary, the beam-shaping component is preferably adapted to the transverse extent (see e.g. the definition below) of the remaining components of the illumination device, with the result that all components have substantially the same cross section. In particular, a compact illumination device can be implemented and the installation, for example, the attachment to the vehicle, can advantageously be facilitated. For this purpose, the optically active surfaces (contributing to the beam shaping) of the beam-shaping component can be appropriately trimmed.

In a further example embodiment, more than one illumination channel is included, wherein the illumination channels are arranged next to one another in the transverse direction perpendicular to the radiation main direction of the illumination arrangement, wherein the light guide bodies of each illumination channel are encompassed in a monolithic component.

The transverse direction preferably denotes the extent of the illumination device in the transverse direction, perpendicular to the longitudinal direction. The transverse direction preferably lies in a cross-sectional plane perpendicular to the longitudinal plane. The illumination channels are preferably arranged "next to one another" in this embodiment and can, for example, realize various holographic lighting functions with different illumination functions for the vehicle, for example, in an illumination device mounted at the rear of the vehicle the functions "rear light" and "turn signal".

In this case, the light guide body is a monolithic, i.e. preferably a contiguous, uniform component. The monolithic component is thus preferably the common light guide body of the illumination channels. Preferably, no interfaces are provided between the illumination channels within the monolithic component. This enables the production of a particularly simple, compact and inexpensive monolithic component. No complicated measures need to be taken to assemble the components of the different channels, e.g. for adjustment purposes.

In a further example embodiment, the holographic structures of the channels are arranged next to one another in the transverse direction at the output coupling surface. This enables the provision of a particularly esthetic rear lighting function, which can generate the holographic lighting functions of the respective channels directly one next to the other. In addition, the illumination device can be kept particularly compact in the transverse direction.

In a further example embodiment, the holographic structures of adjacent channels have a spacing of less than 1 mm or directly adjoin one another. It has been shown that even at a spacing of less than 1 mm, the illumination channels can be separated well from one another, thus avoiding undesirable, clearly visible shadow areas between the channels at the same time.

In a further example embodiment, the holographic structures of the illumination channels are encompassed in a common holographic structure. This has, for example, manufacturing advantages. The common holographic structure may have the same holographic lighting function for both illumination channels. This is particularly advantageous if the multiple channels serve to ensure that illumination is more or less strong or, for example, if a more or less wide cross-sectional area of the visible holographic lighting function is to be created. It is advantageously possible here to achieve particularly homogeneous illumination.

However, it may also be preferred that the common holographic structure has different holographic lighting functions for the different illumination channels, for example due to different exposure during production.

In a further example embodiment, more than one illumination channel is included, wherein a monolithic lens system having a beam-shaping component in the form of a lens for each illumination channel is included.

The lens system is preferably a contiguous, uniform component. A monolithic lens system can already be adapted during the development particularly well with regard to the monolithic light guide body and the mutually adjacent holographic structures and does not require complicated adaptation and adjustment processes during production and installation. Furthermore, a monolithic lens system is particularly compact and resource-saving.

In a further example embodiment, the lens system comprises compound aspheres. This enables the provision of complex and improved beam shaping functions in a single, monolithic component.

In a further example embodiment, adjacent lenses of the lens system adjoin one another. This allows the lens system and the entire illumination device to be kept particularly compact, especially in the transverse direction. Even if the holographic structures of adjacent channels are spaced less than 1 mm apart or directly adjoin each other, a good respective lighting of the holographic structure of each channel can be achieved.

In a further example embodiment, optically functional surfaces have a rectangular boundary, and/or optically functional surfaces of adjacent lenses directly transition into each other. This refers in particular to the lens system. Due to the rectangular boundary, the lens system is preferably adapted to the transverse extent of the remaining components of the illumination device, with the result that all components have substantially the same cross section. In particular, a compact illumination device can be implemented and the installation, for example, the attachment to the vehicle, can advantageously be facilitated. For this purpose, the optically active surfaces (contributing to the beam shaping) of the lens system can be appropriately trimmed.

Due to the fact that the optically functional surfaces transition or merge directly into one another, installation space can be saved and the illumination of holographic structures of various illumination channels, which adjoin one another directly or with little or no distance, can be made possible. Preferably, an appropriate, complex lens design can simultaneously make possible that crosstalk of adjacent channels is prevented as far as possible.

In a further example embodiment, the illumination channels are configured to suppress the illumination of the holographic structure of one illumination channel by the illumination arrangement of another illumination channel, wherein the suppression preferably equals at least two orders of magnitude between the intensity of the illumination channel and the intensity of the other illumination channel. This is to prevent crosstalk between the channels.

This can be realized, for example, by good collimation, inhomogeneous illumination of the adjacent holographic structure, which decreases at least toward the periphery at which the holographic structure is located.

Intensity can be expressed in watts per square meter ($W/m^2$), for example. However, it may also mean the luminous intensity. The luminous intensity preferably indicates the luminous flux related to the solid angle. Its SI unit is in particular the candela (cd). However, it may preferably also mean the luminous flux. Luminous flux is preferably a photometric variable which indicates the light emitted by a light source per unit time that is perceivable by the human eye. In addition to the physical (radiometric) radiant flux, it preferably takes into account the sensitivity of the human eye. It is given in the unit lumen (lm). It may preferably also mean the luminous intensity. However, it can also mean the illuminance in lux. Luminous intensity is preferably defined by $d\phi_v/d\Omega$, where $d\Omega$ preferably describes an infinitesimal solid angle element and $d\phi_v$ describes the luminous flux component in the solid angle element $d\Omega$. Suppression by at least two orders of magnitude means in particular that the intensity of the illumination of a holographic structure by means of an illumination arrangement that is assigned to that structure and belongs to the same illumination channel is stronger at least by a factor of 100 or more than 99% than the illumination of the holographic structure by means of the illumination arrangement of another, directly adjacent channel, if this is also switched on.

In a further example embodiment, at least one stop is included between adjacent illumination channels, wherein the stop is preferably arranged between the light source and the beam-shaping component and/or between the beam-shaping component and the input coupling surface. A stop between the light source and the beam-shaping component could, for example, "shadow" adjacent illumination channels from one another in a region between the LED (preferred light source) and the lens (preferred beam-shaping component). Thus, crosstalk, which is on the cards due to appropriately oriented rays outside the beam-shaping component and/or outside the light guide body, can be prevented particularly well. The stops are preferably designed from a light-absorbing material. The stops can be kept very thin in this case so as not to impair the compact design and not to be visible, or hardly visible, from the outside. In particular, the stops may have a transverse thickness of 1 mm or less. The stops can also be kept very short, so that they do not or hardly affect the installation space in the horizontal direction. The stops between the beam-shaping component and the light guide body may preferably be mounted in the regions of the lens system where they adjoin one another and the lenses are often thinnest in the radiation direction. This means that crosstalk can be achieved without or only with a small increase in the installation space.

In a further example embodiment, the beam-shaping component, preferably the lens, is configured for total internal reflection of light rays input-coupled into the lens, which are oriented in the direction of the adjacent illumination channel and/or come from the adjacent illumination channel.

The lenses could, for example, be constructed or designed such that they have a strong curvature toward the adjacent lens, so that potential light radiating in from a lens of an adjacent lens segment of an adjacent channel due to the otherwise desired large numerical aperture (NA) is totally internally reflected due to the strong curvature of the lens and is coupled out again to the rear or to the side and is therefore not directed toward the light guide body.

In a further example embodiment, the illumination channel is configured for a predominantly homogeneous illumination of the holographic structure of the illumination channel. This can be achieved by suitable beam shaping, in particular by suitable collimation.

In this case, homogeneous means that, in particular, the holographic structure is illuminated with predominantly the same intensity over its entire surface. Preferably, a deviation in intensity over the holographic structure is less than 20%, more preferably less than 10%, and in particular less than 5%. Preferably, a ratio of minimum intensity $I_{min}$ (or minimum illuminance or irradiance) to maximum intensity $I_{max}$ (or maximum illuminance or irradiance) is $I_{min}/I_{max} > 0.8$.

In particular, in connection with the embodiment in which the holographic structures of the channels are arranged next to one another in the transverse direction on the output coupling surface, in which the holographic structures of adjacent channels have a spacing of less than 1 mm or directly adjoin one another and/or in which the illumination channels are configured to suppress the illumination of the holographic structure of an illumination channel by the illumination arrangement of another illumination channel, a desirably homogeneous illumination of directly adjacent holographic structures can be achieved at the same time, advantageously without crosstalk. This can be achieved by combining the structural features of the embodiments described. Since the measures against cross-talk of the channels in particular are very effective, this combination can surprisingly be implemented.

In a further example embodiment, the illumination channel is configured for inhomogeneous illumination of the holographic structure of the illumination channel, preferably with a drop in intensity in a peripheral region and/or central region of the holographic structure.

Intensity curves within or through the holographic structure can be controlled, firstly, by varying the efficiency of the holographic structure. For example, there may be a variation from 100% (all light is coupled out) to 50% (half the light is coupled out). However, a part of the light that illuminates the holographic structure is not "used" because it is not output coupled. In addition, the illumination arrangement can be configured to light the holographic structure with an intensity profile. For example, the holographic structure is already illuminated inhomogeneously (e.g., from 100% to 50% intensity) on account of a suitable shape of the beam-shaping component. In that case the holographic structure preferably has an efficiency of 100% throughout, which is to say all of the light is output coupled (if the 0th order, for example, is ignored). With this embodiment, which is geared toward illumination with an intensity profile, a defined intensity profile can be demanded and, at the same time, the amount of output-coupled light or the efficiency can be maximized. At the same time, particular lighting functions can be generated in this way.

In a further example embodiment, the light source comprises at least one LED.

In a further example embodiment, the emission spectrum of the LED can be assigned to one color, preferably according to the dominantly emitted wavelength. In this way, colored lighting functions can be implemented.

Suitable light sources or LEDs are Osram Synios P2720, for example.

In a further example embodiment, the emission spectrum of the LED cannot be assigned to one color but comprises preferably a white light spectrum. White lighting functions or multi-colored lighting functions which are visible in different fields of view due to the different diffraction directions of the holographic structure can be realized in this way.

A combination of both embodiments is also included, wherein the lighting function (or a generated image) may comprise monochromatic and multi-colored components.

Suitable light sources or LEDS are Osram MultiLED LRTB GVSG and/or Osram Synios P2720, for example.

In a further example embodiment, more than one illumination channel is included, wherein the LEDs are configured to emit in the same spectral range. This allows different lighting functions of the same color to be implemented.

In a further example embodiment, the beam-shaping component and/or the light guide body is configured for a production-oriented shaping without undercuts, but with draft angles and/or with rounded areas.

For example, an undercut denotes a structural element that protrudes freely and thus for example can prevent a cast part from being able to be removed from its mold. The avoidance of an undercut is therefore particularly advantageous for simple and cost-effective mass production.

In another example, there is a mold that contains the negative of the component to be manufactured, and the pressed or injection-molded part needs to be separated from the mold. It is then preferable to have a specific angle at the edges so that the part does fall out of the mold.

A draft angle preferably refers to the minimum required deviation from a perpendicular for mold separation. Common sizes for the necessary draft angles are known to a person skilled in the art.

A rounded area refers in particular to a rounded area of a component edge. In particular, rounded areas with a radius of the order of or greater than 2 mm can be realized particularly cost-effectively in mass production.

Further provided is a rear light for a vehicle, in particular for a motorcycle, comprising an illumination device according to the descriptions in this document.

The advantages, definitions, and embodiments of the Illumination device likewise apply to the rear light.

For rear lights, the required installation space sizes are particularly critical. A flat component is required, which simultaneously realizes the desired lighting functions. At the same time, rear lights have a particular relevance with regard to vehicle safety. A warning function, e.g. before intensive braking, is particularly important in this context. For this reason, holographic lighting functions with which advantageous warning and signal functions can be realized are particularly advantageous for rear lights.

In particular in a motorcycle, the installation space is critical and there are often no sufficiently large, completely vertically arranged surfaces in the rear area for the arrangement of a rear light. The rear light according to this document is particularly flat and therefore particularly advantageous for a motorcycle. The diffraction function of the holographic structure, which can diffract the light out of the output coupling surface at an angle not equal to zero with the surface normal of the output coupling surface, can also be realized with an oblique arrangement of a lighting function, which, for example, is perceivable along a substantially horizontal line and is thus within the field of view of a road user following the motorcycle.

In a example embodiment, legal lighting requirements for the rear light are satisfied and the rear light has in particular an intensity of between 4 and 12 cd in a horizontal angle range from −80° to +80° starting from a longitudinal axis of the vehicle or an intensity between 40 and 185 cd in a horizontal angle range from −45° to +45° starting from the longitudinal axis of the vehicle.

The emitted light of a rear light may advantageously not fall below or exceed specific luminous intensities. In particular, corresponding angle ranges or test points for which this must be fulfilled are defined. This is preferably dependent on the country where the vehicle is registered. For Europe, for example, there is a uniform regulation such as is stipulated for example in E/ECE/324/Rev.1/Add.49/Rev.3-E/ECE/TRANS/505/Rev.1/Add.49/Rev.3, Regulation No. 50.

Due to the versatile manners of influence with regard to beam shaping by the beam-shaping component and/or the input coupling surface, due to the ability to influence the diffraction properties of the holographic structure and/or due to the possibilities of using standard light sources, the rear light can advantageously realize these requirements, at the same time be compact and have holographic lighting functions.

An intensity of between 4 and 12 cd in a horizontal angle range from −80° to +80° starting from a longitudinal axis of the vehicle is in particular suitable for a standard rear light or a standard rear lamp.

An intensity of between 40 and 185 cd in a horizontal angle range from −45° to +45° starting from the longitudinal axis of the vehicle is in particular advantageous for a brake lamp.

Also provided is a lighting display for a vehicle, in particular for a passenger car or a truck, comprising an illumination device according to the description in this document.

The advantages, definitions, and embodiments of the Illumination device likewise apply to the lighting display.

In an example embodiment, the lighting display is configured to display several possible pieces of information, wherein more than one illumination channel is included, wherein one piece of information is assigned to one illumination channel.

These illumination channels can preferably also be arranged in a different direction relative to each other than in the transverse direction as described above.

Further provided is an illumination element for the interior of a vehicle, in particular for a passenger car or a truck, comprising an illumination device according to the description in this document.

The, definitions, and embodiments of the Illumination device likewise apply to the illumination element.

An illumination element in certain examples may comprise a lighting element which is provided for the interior of a vehicle and has an illuminating function there. An illuminating function can be used in particular to light the interior and thus increase operability and/or to fulfill esthetic functions, such as to display lettering and/or a symbol characteristic of the car.

Still further provided is a vehicle, in particular a motorcycle, comprising an illumination device according to the description in this document and/or a rear light according to the description in this document.

The advantages, definitions, and embodiments of the illumination device and of the rear light also apply to the claimed vehicle.

BRIEF DESCRIPTION OF THE DRAWINGS

The invention will be explained below with reference to further figures and examples. The examples and figures serve for illustrating a preferred embodiment of the invention without limiting the latter.

DETAILED DESCRIPTION

Figure 1:
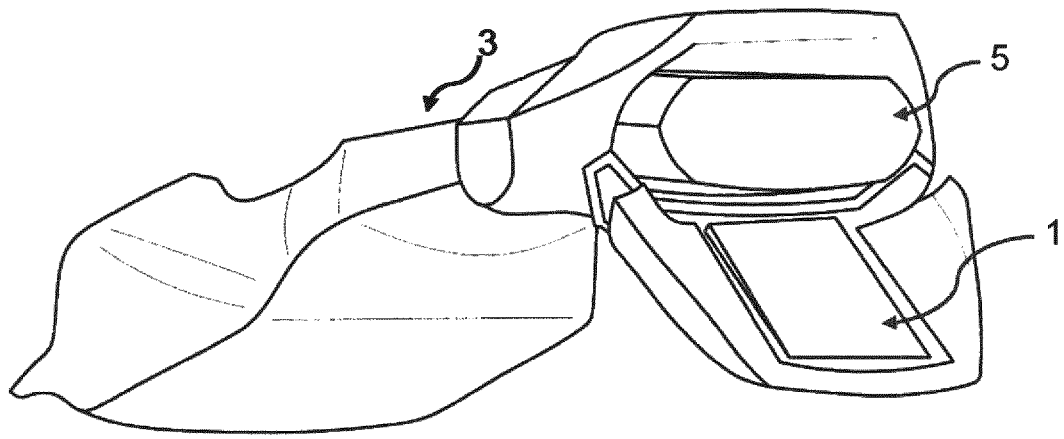
FIG. 1 shows the illumination device on a partially illustrated motorcycle.

FIG. 1 shows the illumination device 1 as a rear light on a partially illustrated motorcycle 3. Also shown is a standard rear light 5 of the motorcycle. It is clear that only very little installation space is available at the location where the illumination device 1, which can fulfill an additional function to the standard illumination, is mounted. However, this is not a problem due to the flat construction of the illumination device 1. The unfavorable angle due to the attachment to the fender of the motorcycle is also not a problem, since the holographic structure can diffract the output-coupled light rays in the direction of the horizontal such that the holographic lighting function is visible to a following road user.

Figure 2:
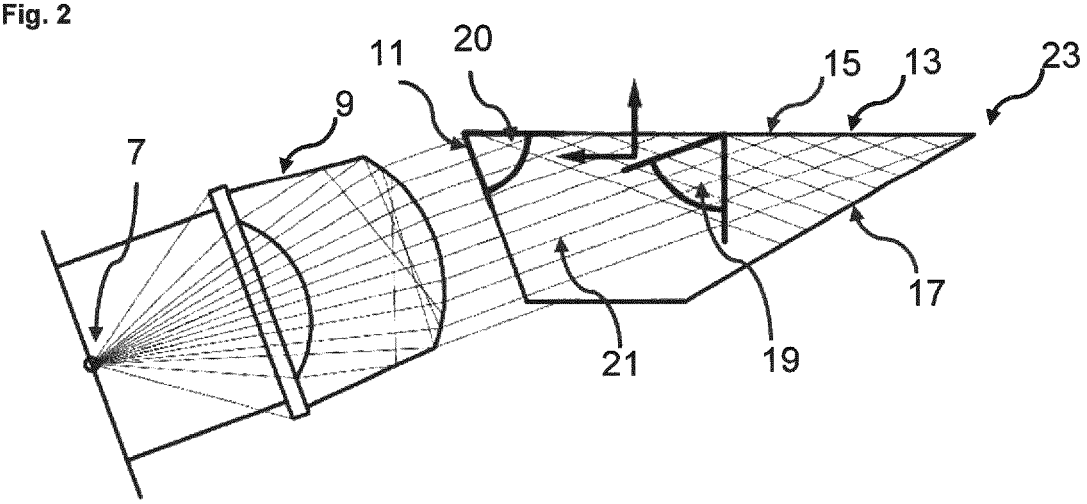
FIG. 2 shows the construction of the illumination device in a side view along the longitudinal sectional plane.

FIG. 2 shows the construction of the illumination device 1 in a side view along the longitudinal sectional plane. The light rays emerge from the light source 7, are collimated by the beam-shaping component 9, here a lens, and are input-coupled into the light guide body 23 via the input coupling surface 11 thereof. The output coupling surface 13 is arranged in the beam path of the input-coupled light rays 21, so that the light rays are incident on the output coupling surface 13 and illuminate the holographic structure 15 arranged thereon at the illumination angle 19. In the example shown, the holographic structure can be a transmission hologram. The illumination angle 19 is given directly by the prism angle 20 in the embodiment shown. The illumination angle 19 or the prism angle 20 is selected such that a total internal reflection of the zero order takes place and whose light rays 21 are reflected toward the further outer surface of the light guide body 17. They can be absorbed or coupled out there, provided that this is not undesirable. The outer surface is arranged such that the light rays of the zero order are not subject there to any total internal reflection in the light guide body 23. Depending on the configuration of the holographic structure, the light rays (not shown) which are diffracted by the holographic structure and output-coupled out of the output coupling surface 13 can be output-coupled out of the output coupling surface 13 at a desired angle.

Figure 3:
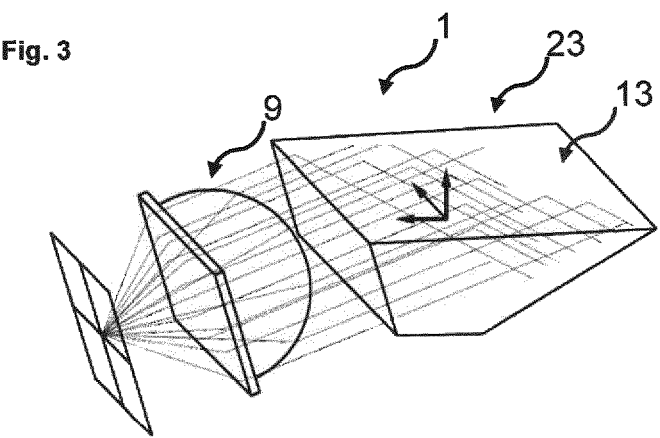
FIG. 3 shows a perspective illustration of the construction of the illumination device.

FIG. 3 shows a perspective illustration of the construction of the illumination device 1 with the beam-shaping component 9 in the form of a lens and the light guide body 23, through whose output coupling surface 13 the light is coupled out to generate the holographic lighting function.

Figure 4:
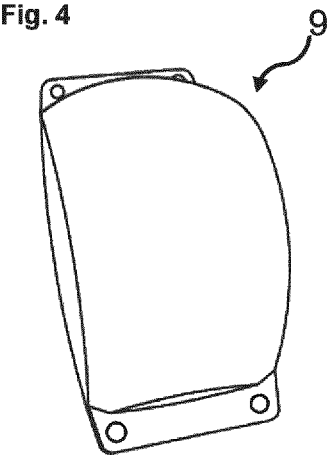
FIG. 4 shows a beam-shaping component of the illumination device.

FIG. 4 shows a beam-shaping component 9 of the illumination device, which is rectangularly trimmed. Rectangular trimming also affects the optically active surfaces. Thus, the beam-shaping component 9 is adapted to the cross section of the other components of the illumination device, which is advantageous for installation. The adapted cross section can also be seen in FIG. 3.

Figure 5:
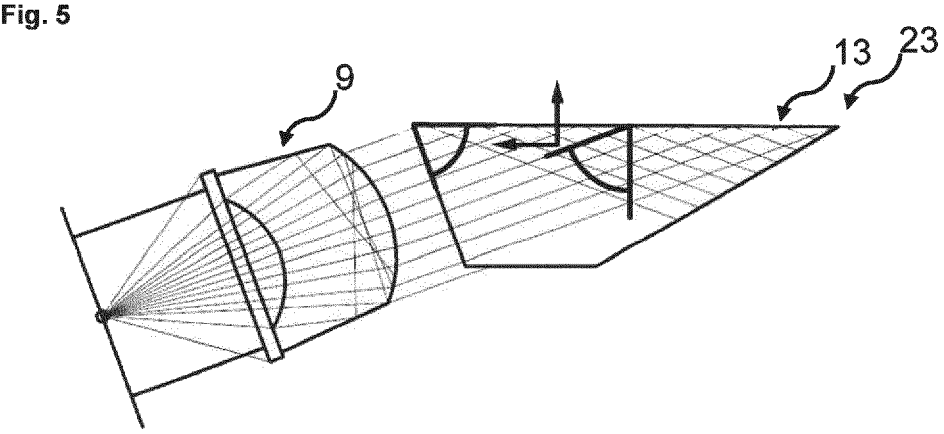
FIG. 5 shows the construction of the illumination device with two illumination channels in a side view along the longitudinal sectional plane.

FIG. 5 shows the construction of the illumination device 1 with two illumination channels in a side view along the longitudinal sectional plane. It can be seen that along this plane, the construction substantially corresponds to the construction according to FIG. 2, the illumination device 1 of which has only one illumination channel. One possible difference is that, with a constant cross-sectional area, the beam-shaping component 9 (here, for example, the lens) in the illumination device 1 having a plurality of illumination channels can have a shorter focal length due to the more compact design even without great structural effort than in the version having one illumination channel. This allows the entire component to be kept more compact.

Figure 6:
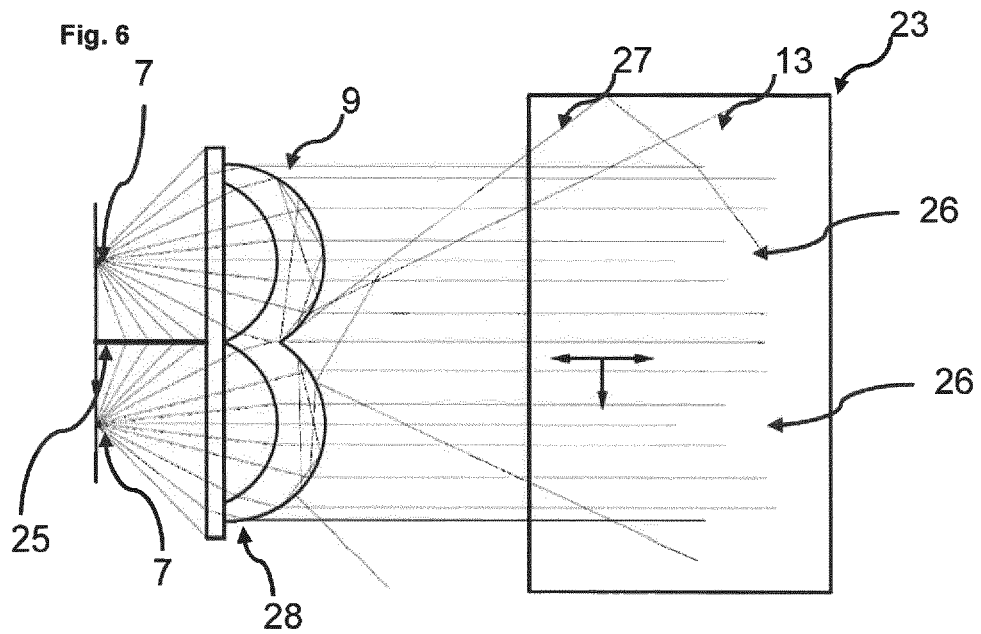
FIG. 6 shows a top view of the illumination device with two mutually adjacent illumination channels.

FIG. 6 shows a top view of the illumination device 1 with two illumination channels 26 arranged next to each other in a transverse direction. It comprises two light sources 7, the illumination light of which is prevented from crosstalk into the respective other illumination channel 26 within the monolithic component 23 by a stop 25 present between the light source 7 and the beam-shaping component 9, prior to the collimation by the respective beam-shaping components 9. The beam-shaping components are implemented in the form of a lens system in a monolithic component 28. As a result, the lenses 9 do not have to be adjusted relative to each other and can also be kept compact. With good collimation, the illumination light after passing through the respective beam-shaping component 9 can be substantially prevented from crosstalking into the respective other illumination channel 26. Only a little light enters the "wrong" illumination channel; individual crosstalking light rays 27 are shown which advantageously have a low intensity due to the construction.

Figure 7:
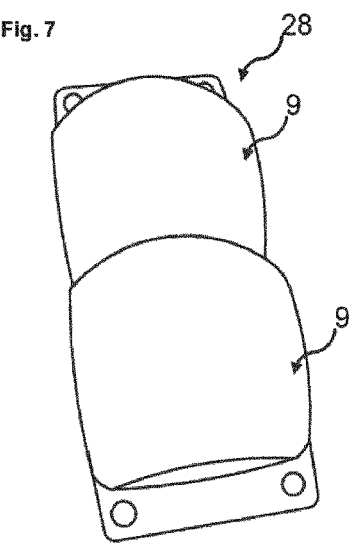
FIG. 7 shows the monolithic lens system of an illumination device with two illumination channels.

FIG. 7 shows the monolithic lens system 28 of an illumination device 1 with two illumination channels. The two lenses 9 arranged next to each other are encompassed in a monolithic component, wherein the optically functional surfaces directly transition into one another. The component 28 is trimmed rectangularly, which also affects the optically functional surfaces of the lenses 9. The lenses 9 do not have to be laboriously adjusted relative to each other, but are already aligned with each other within the scope of the manufacturing tolerances. The cross-section of the component 28 is already adapted to the further components of the illumination device 1 and a compact construction with easy installation in the vehicle can be ensured.

Figure 8:
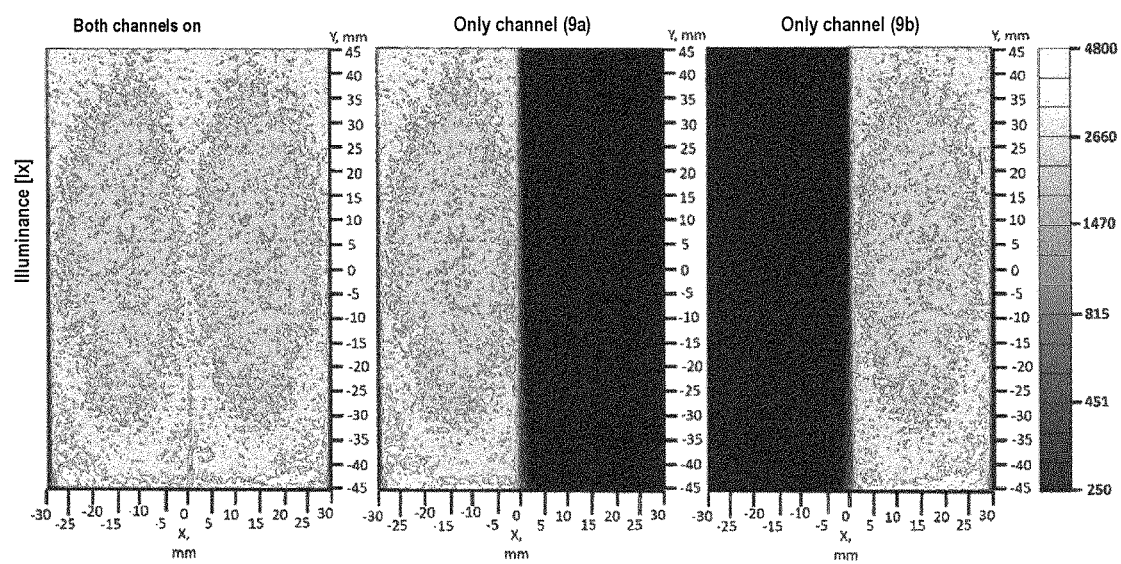
FIG. 8 shows the intensity of the lighting function of two mutually adjacent illumination channels in different switching states.

FIG. 8 shows the intensity of the lighting function of two mutually adjacent illumination channels in different switching states when viewing the output coupling surface. The intensity is shown here by way of the illuminance in lux. The lux unit of measurement is preferably defined as the photometric illumination produced by a luminous flux of 1 lumen (lm) when evenly distributed over an area of 1 square meter. From the representation of the illuminance, the measure of the homogeneity of the lighting of the respective channel on the output coupling surface can be determined and also the separation of the channels, at least with a switched-off illumination channel. On the far left, both channels are switched on. These are homogeneous in each case. The holographic structure here comprises a common holographic structure, which generates a single holographic lighting function when both channels are illuminated together. The two depictions on the right each show a switched-off channel and it is clear that the switched-on channel is still homogeneously lit while the switched-off channel (shown in black) remains dark. Therefore advantageously no visible crosstalk can be detected.

Figure 9:
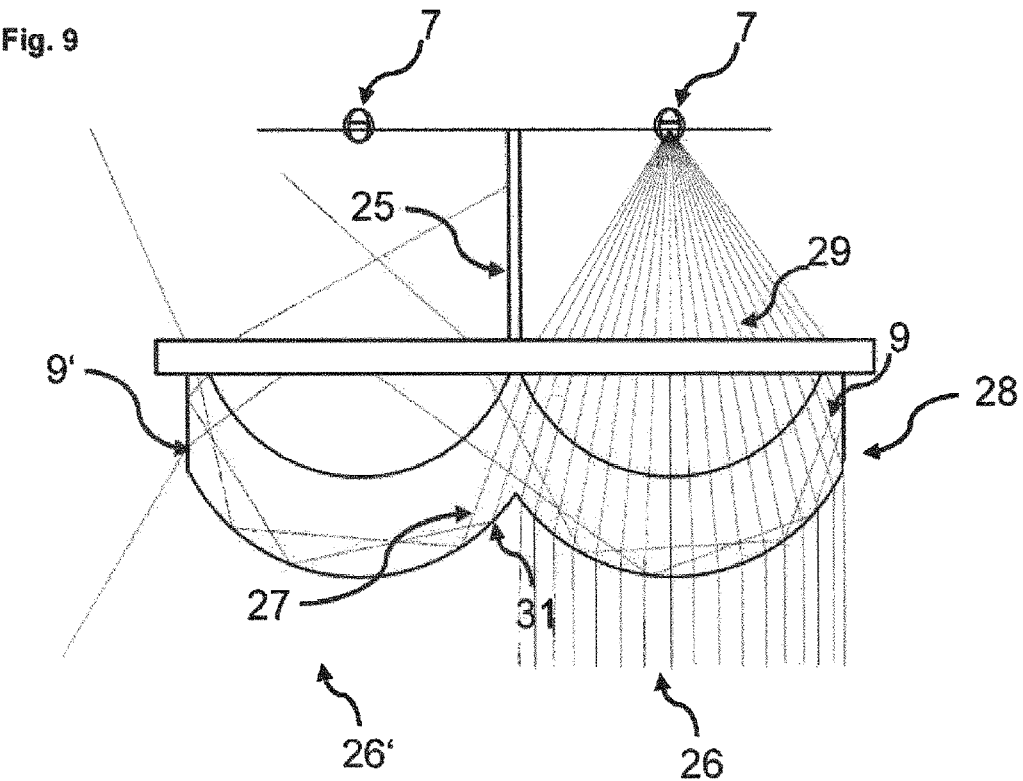
FIG. 9 shows schematically embodiments for suppressing crosstalk between adjacent channels.

FIG. 9 shows schematically embodiments for suppressing crosstalk between adjacent illumination channels 26 and 26'. Here, only the right-hand illumination channel 26 is switched on, the light source 7 of which initially emits a beam directed in different spatial directions. Crosstalk is achieved at this point by means of a stop element 25. The rays are then input-coupled into the monolithic component 28 with the two lenses 9. Here, the light rays are collimated and directed into the correct illumination channel 26 as a collimated beam. Due to the large NA 29 of the lens 9, however, light rays from the light source 7 are also captured by the lens 9, which input-couple into the monolithic lens system 28 at a large angle with the optical axis. Therefore, these can still be input-coupled into the lens 9' of the adjacent channel 26' within the lens system 28. However, the lens 9' has such a strong curvature 31 in the region which rays of the adjacent channel 26 predominantly enter that these crosstalking light rays 27 are totally internally reflected within the lens 9' and deflected to the side or to the rear (counter to the actual beam direction), so that crosstalk can be prevented.

Figure 10:
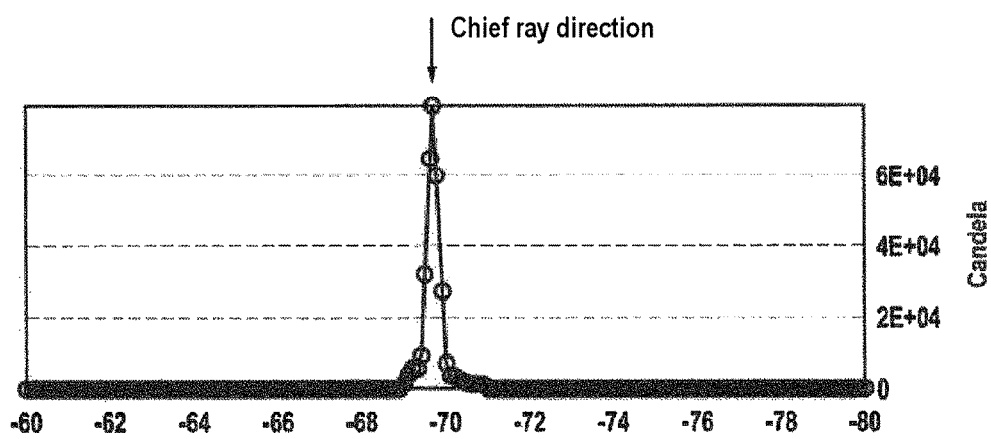
FIG. 10 shows a measurement of an angular spectrum of the illumination of the holographic structure.

FIG. 10 shows a measurement of a typical angular spectrum of the illumination of the holographic structure. The intensity is given in cd. The peak indicates the radiation main direction of the input-coupled light rays (or synonymously: chief ray direction), measured at the plane of the holographic structure or the output coupling surface, here at about −70°, whereby the angle is negative due to the measurement convention. The angular spectrum is the regions encompassed by the peak and is here less than +1°, because the beam is very well collimated. This allows a particularly high-quality lighting function to be produced.

Figure 11:
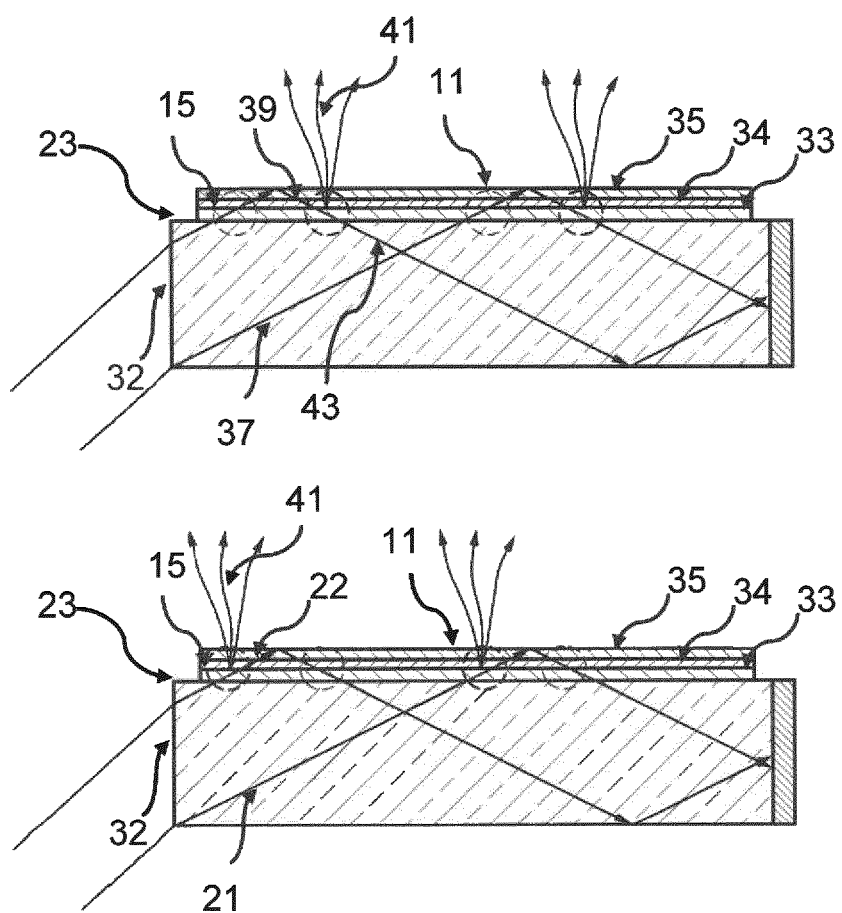
FIG. 11 illustrates the possible realizations and arrangements of the holographic structure.

FIG. 11 is to be used essentially to clarify the possible realizations of the holographic structure 15. FIG. 11 shows a light guide body 23, which, for example, comprises a transparent glass or PMMA substrate 32, into which light is input-coupled from the left side and then is incident on the upper surface of the light guide body 23. Located at this upper surface are a plurality of layers, which are preferably also encompassed by the light guide body 23. As the first, lowermost layer, a hologram layer 33 is present which comprises the holographic structure 15. The next layer is a layer with triacetate (TAC) 34. This is followed on top by a layer of a transparent adhesive layer or adhesive film (OCA—not shown), which in turn is covered by a layer/film made of polycarbonate (PC) 35. Preferably, there is only a small difference in the refractive index between the substrate 32 and the applied layers and between the layers among one another, and so a total internal reflection of the rays input-coupled into the light guide body 23 takes place only at the top layer, which is typically adjacent to air. The output coupling surface 13 is preferably the surface on which the light input-coupled into the light guide body 23 actually exits or is reflected, thus the surface of the PC layer 35, which is not arranged toward the other layers/to the light guide body 23 in the example shown.

The above example of FIG. 11 shows how the holographic structure 15 can be designed as a reflective hologram. The latter is configured and arranged in such a way that input-coupled light 37 which has not yet been reflected, or light in the example shown which comes from the direction of the substrate, is not diffracted by the reflective hologram but simply transmitted. Light 39 in turn which was previously transmitted by the hologram, is reflected at the output coupling surface 13 and is then incident on the holographic structure 15, is reflected by the reflection hologram and is diffracted 41 according to the lighting function to be generated. The undiffracted light (preferably the zero order) 43 is transmitted back into the substrate 32 of the light guide body 23.

In the lower example of FIG. 11, the holographic structure 15 is a transmissive hologram. The latter diffracts 41 the light 21 coming from the direction of the substrate directly, without this light previously having been subjected to total internal reflection at the output coupling surface 13. Only the light transmitted without diffraction, preferably also referred to as the zero order 22, is then totally internally reflected at the output coupling surface 13 and is also subsequently not diffracted by the transmission hologram, but is transmitted back into the substrate 32 of the light guide body 23.

Figure 12:
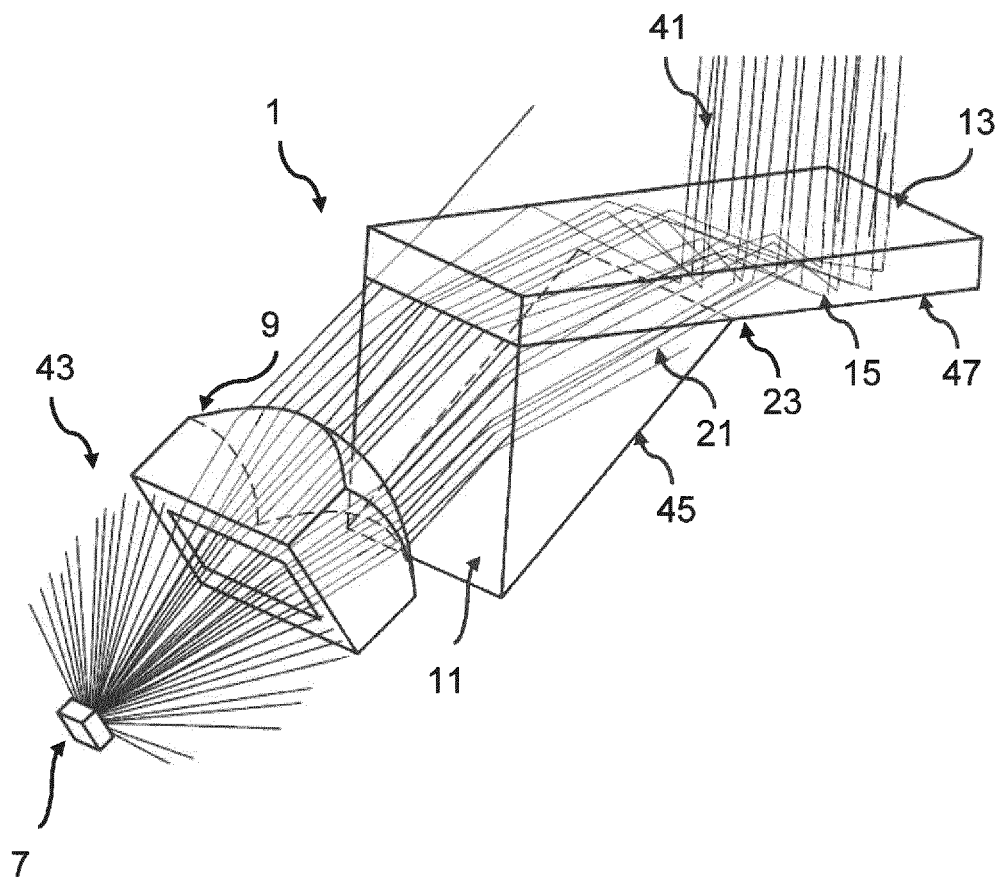
FIG. 12 shows an embodiment of the illumination device for a display in a perspective view.
Figure 13:
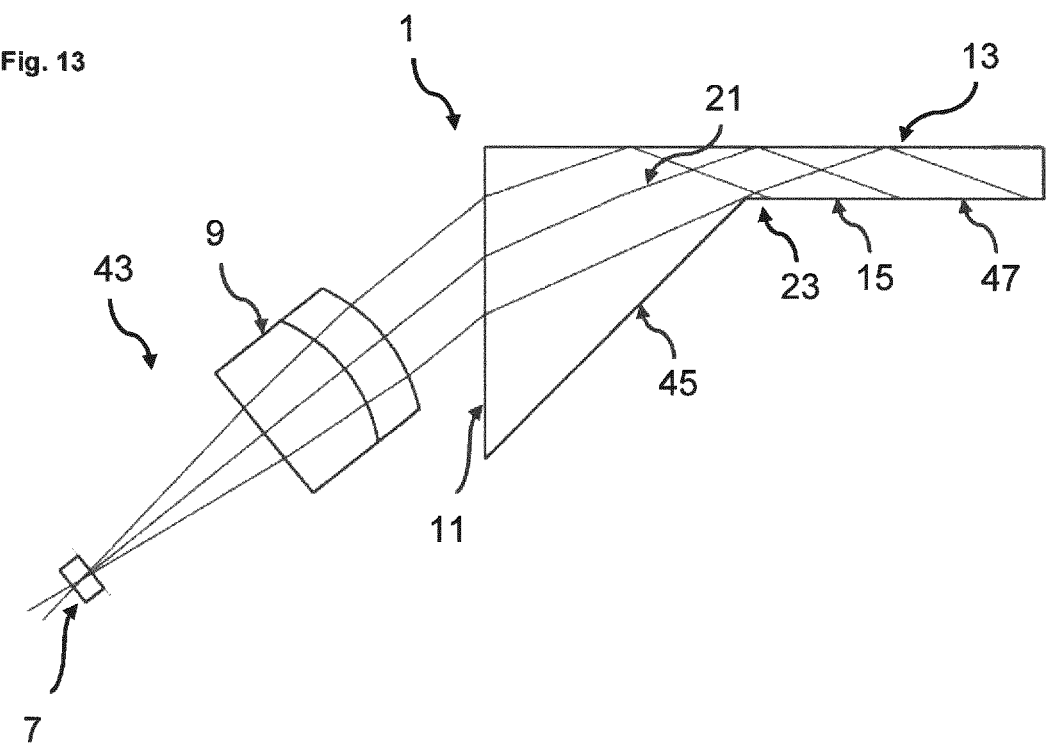
FIG. 13 shows an embodiment of the illumination device for a display in a lateral view.

FIG. 12 (perspective) and FIG. 13 (side view) show an embodiment of the illumination device 1 for a display. In this case, the input coupling surface 11 in the example shown is not arranged in a plane perpendicular to a radiation main direction of the illumination arrangement, input coupling surface 11 and output coupling surface 13 are arranged at an angle of 90° with respect to each other, and the light guide body 23 preferably widens toward the input coupling surface 45. However, this is not necessarily the case with the illumination device 1 for the display; rather, the input coupling surface 11 could also be arranged perpendicular to the radiation main direction. This can be decided, for example, depending on the available installation space and the desired beam path in the light guide body 23.

Illumination light is input-coupled from an illumination arrangement 43 formed by a light source (e.g. LED) 7 and a lens 9 through the input coupling surface 11 into the light guide body 23. The input coupling surface 11 is preferably arranged at an angle smaller than 90° with respect to the radiation main direction of the illumination arrangement. The input-coupled light is refracted to the perpendicular (surface normal of the input coupling surface 11) due to the difference in the refractive index between the light guide body 23 and the environment, as a result of which the angle between the surface normal to the output coupling surface 13 and the beam path of the input-coupled light rays 21 is reduced compared with the radiation direction before input coupling and thus total internal reflection of the input-coupled light rays 21 also takes place at the output coupling surface 13 at very oblique radiation into the light guide body 23.

Each input-coupled beam path 21 is then reflected once at the output coupling surface 13 and only then reaches the holographic structure 15, which is arranged in the embodiment shown at a parallel outer surface 47 of the light guide body 23 opposite the output coupling surface 13. Preferably, this is a holographic structure 15 arranged at the output coupling surface 13, which is arranged at a distance of at most 5 mm from the output coupling surface 13, because the parallel outer surface 47 is arranged at a distance of at most 5 mm from the output coupling surface 13. However, this is not mandatory in the illumination device for a display; rather it could also be a holographic structure 15, which is not arranged at an outer surface of the light guide body 23, but is arranged in the interior of the light guide body 23 at the output coupling surface 13, as described above in numerous embodiments. The display (the holographic lighting function) is then realized by means of light rays 41 which are coupled out upwards through the output coupling surface 13 and diffracted by the holographic structure 15 in the present example.

Figure 14:
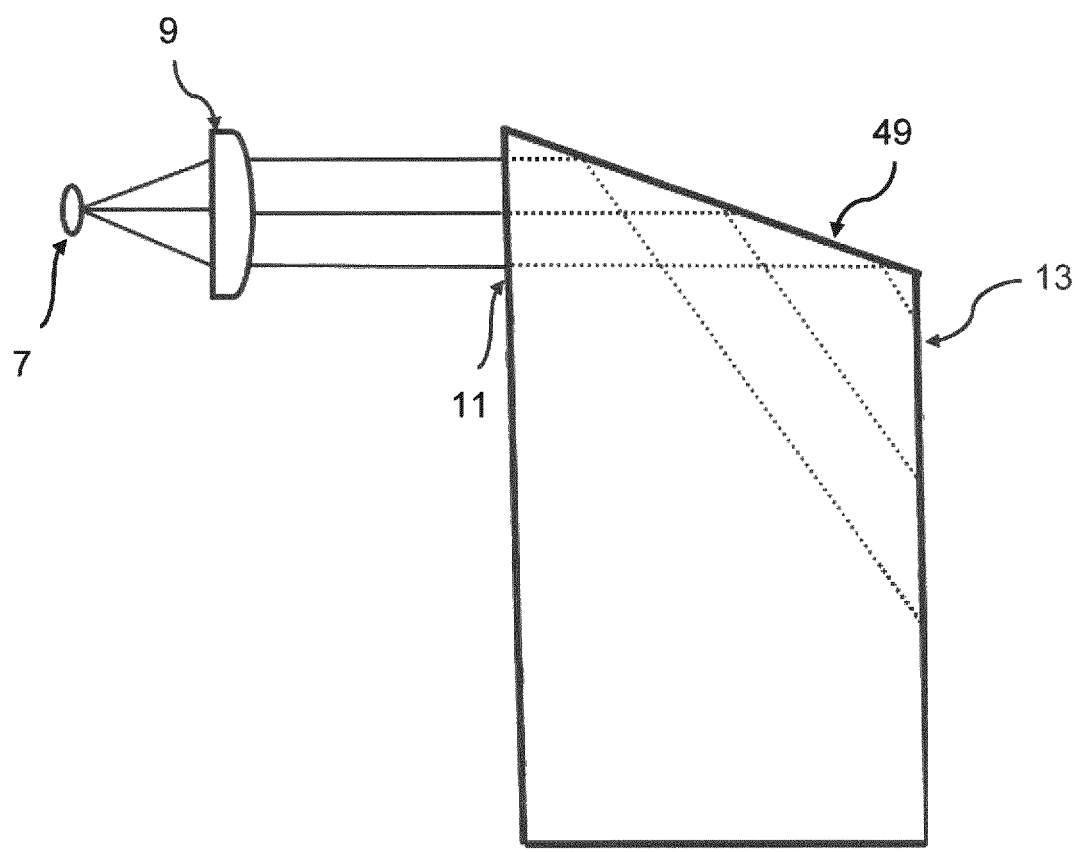
FIG. 14 shows an embodiment comprising a reflection surface.

FIG. 14 shows an embodiment comprising a reflection surface. In this case, the light guide body 23 has an output coupling surface 13 parallel to the input coupling surface 11, and the reflection surface 49 is an outer surface of the light guide body 23 located directly between the input coupling surface 11 and the output coupling surface 13. The input coupling surface 11 is arranged in a plane perpendicular to a radiation main direction of the illumination arrangement. The reflection surface 49 is arranged at an angle to the input coupling surface 11 so that the input-coupled light rays of the illumination light are totally internally reflected at the reflection surface 49 and the output coupling surface 13 is illuminated at an angle 19 greater than a critical angle of the total internal reflection.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

LIST OF REFERENCE SIGNS

1 Illumination device
3 Motorcycle (partial illustration)
5 Standard rear light
7 Light source
9 Beam-shaping component
11 Input coupling surface
13 Output coupling surface
15 Holographic structure
17 Further outer surface of the light guide body
19 Illumination angle
20 Prism angle
21 Beam path of the input-coupled light rays
22 Totally internally reflected zero order 23 Light guide body
25 Stop element
26 Illumination channel
27 Crosstalking light ray
28 Monolithic lens system
29 NA of the lens
31 Strong curvature of the lens
32 Transparent substrate of the light guide body
33 Hologram layer
34 Layer with triacetate
35 Layer with polycarbonate
37 Input-coupled light which has not yet been reflected at the output coupling surface
39 Light transmitted by the reflection hologram
41 Light diffracted by the holographic structure
43 Zero order of diffraction of the reflection hologram
45 Widening of the light guide body toward the input coupling surface
47 Outer surface of the light guide body parallel to the output coupling surface
49 Reflection surface

The invention claimed is:

1. An illumination device for a vehicle with at least one illumination channel for generating a holographic lighting function assigned to this illumination channel by illumination of a holographic structure of the illumination channel, the illumination device comprising:
an illumination arrangement of the illumination channel that generates illumination light;
a light guide body having an input coupling surface arranged along a radiation main direction of the illumination arrangement; and
an output coupling surface of the light guide body at which the holographic structure is arranged,
wherein the output coupling surface is arranged in a beam path of light rays of the illumination light which are input-coupled into the light guide body for illumination of the output coupling surface at an angle greater than a critical angle of the total internal reflection, and
wherein each input-coupled light ray which reaches the output coupling surface and which is not diffracted by the holographic structure does not reach the output coupling surface again due to total internal reflection.

2. The illumination device of claim 1, wherein the output coupling surface and the holographic structure are configured to generate the holographic lighting function by output-coupling input-coupled light rays of the illumination light out of the output coupling surface.

3. The illumination device of claim 1, wherein the holographic structure comprises at least one transmissive hologram.

4. The illumination device of claim 1, wherein the holographic structure comprises at least one reflective hologram, wherein the reflective hologram and the output coupling surface are configured and/or arranged to generate the holographic lighting function after a reflection of the input-coupled light rays at the output coupling surface.

5. The illumination device of claim 1,
wherein the light guide body comprises a transparent substrate and at least one layer applied to the transparent substrate,
wherein the output coupling surface comprises the at least one layer, and
wherein the holographic structure is present within the at least one layer between the transparent substrate and the output coupling surface within a hologram layer.

6. The illumination device of claim 1,
wherein the holographic structure is arranged at an outer surface of the light guide body that lies opposite to the output coupling surface and parallel to the output coupling surface, and
wherein the outer surface parallel to the output coupling surface is arranged 5 mm or less from the output coupling surface.

7. The illumination device of claim 1, wherein the output coupling surface is arranged at an angle to a radiation main direction of the input-coupled light rays of the illumination light between 0° and a complementary angle of the critical angle of the total internal reflection.

8. The illumination device of claim 1,
wherein the input coupling surface is arranged in a plane perpendicular to a radiation main direction of the illumination arrangement, and
wherein the input coupling surface and the output coupling surface enclose an angle in a range of a critical angle of total internal reflection to 90°.

9. The illumination device of claim 1,
wherein the input coupling surface is not arranged in a plane perpendicular to a radiation main direction of the illumination arrangement,
wherein the input coupling surface and the output coupling surface are arranged at an angle of 90° relative to each other, and
wherein the light guide body is widened toward the input coupling surface.

10. The illumination device of claim 1, further comprising a reflection surface of the light guide body arranged in the beam path between the input coupling surface and the output coupling surface for a single total internal reflection of the input-coupled light rays of the illumination light at the reflection surface before the illumination of the output coupling surface.

11. The illumination device of claim 10,
wherein the input coupling surface is arranged in a plane perpendicular to a radiation main direction of the illumination arrangement, and
wherein the reflection surface is arranged at an angle with respect to the input coupling surface such that the input-coupled light rays of the illumination light are totally internally reflected at the reflection surface and the output coupling surface is illuminated at an angle greater than a critical angle of the total internal reflection.

12. The illumination device of claim 10, wherein the light guide body has an output coupling surface parallel to the input coupling surface, and the reflection surface is an outer surface of the light guide body located directly between the input coupling surface and the output coupling surface.

13. The illumination device of claim 1,
wherein the illumination arrangement comprises a light source and a beam-shaping component, which are arranged along the radiation main direction of the illumination arrangement,
wherein the beam-shaping component a collimation lens, which is configured to collimate the light rays from the light source, and
wherein the collimation lens is arranged such that a focal plane of the collimation lens coincides with an emitter surface of the light source.

14. The illumination device of claim 1,
wherein the input coupling surface is not planar and is configured for a light-shaping function, and
wherein the input coupling surface is curved in a defined manner.

15. The illumination device of claim 1,
wherein more than one illumination channel is included,
wherein the illumination channels are arranged next to one another in the transverse direction perpendicular to the radiation main direction of the illumination arrangement,
wherein light guide bodies of each illumination channel are encompassed in a monolithic component, and either:
    wherein the holographic structures of the illumination channels are arranged next to one another in the transverse direction on the output coupling surface, or
    wherein the holographic structures of the illumination channels are encompassed in a common holographic structure.

16. The illumination device of claim 15, wherein a monolithic lens system is included, which comprises a beam-shaping component in the form of a lens for each illumination channel.

17. The illumination device of claim 16, further comprising at least one stop between adjacent illumination channels, wherein the at least one stop is arranged between the light source and the beam-shaping component and/or between the beam-shaping component and the input coupling surface.

18. The illumination device of claim 16, wherein the beam-shaping component comprises a lens that is configured for internal total internal reflection of light rays input-coupled into the lens, which are oriented in the direction of the adjacent illumination channel and/or come from the adjacent illumination channel.

19. A tail light for a vehicle, comprising:
the illumination device of claim 1, wherein legal illumination requirements for the tail light are fulfilled, and
wherein the tail light has an intensity of either:
    between 4 and 12 cd in a horizontal angle range from −80° to +80° starting from a longitudinal axis of the vehicle, or
    between 40 and 185 cd in a horizontal angle range from −45° to +45° starting from the longitudinal axis of the vehicle.

20. A lighting display for a vehicle, comprising the illumination device of claim 1, wherein the lighting display is configured to display a plurality of pieces of information, wherein more than one illumination channel is included, wherein one piece of the plurality of pieces of information is assigned to one illumination channel.

21. A vehicle, comprising the illumination device of claim 1, the tail light of claim 19 or the lighting display of claim 20.

22. An illumination device for a vehicle with at least one illumination channel for generating a holographic lighting function assigned to this illumination channel by illumination of a holographic structure of the illumination channel, the illumination device comprising:
    an illumination arrangement of the illumination channel that generates illumination light;
    a light guide body having an input coupling surface arranged along a radiation main direction of the illumination arrangement; and
    an output coupling surface of the light guide body at which the holographic structure is arranged,
    wherein the output coupling surface is arranged in a beam path of light rays of the illumination light which are input-coupled into the light guide body for illumination of the output coupling surface at an angle greater than a critical angle of the total internal reflection,
    wherein the holographic structure comprises at least one reflective hologram, and
    wherein the reflective hologram and the output coupling surface are configured and/or arranged to generate the holographic lighting function after a reflection of the input-coupled light rays at the output coupling surface.

* * * * *